US011763396B2

(12) United States Patent
Schneider

(10) Patent No.: US 11,763,396 B2
(45) Date of Patent: Sep. 19, 2023

(54) APPARATUS AND SYSTEM FOR PROVIDING REMINDERS AND RECOMMENDATIONS, STORING PERSONAL INFORMATION, MEMORY ASSISTANCE AND FACILITATING RELATED PURCHASES THROUGH AN INTERCONNECTED SOCIAL NETWORK

(71) Applicant: Not So Forgetful LLC, Chandler, AZ (US)

(72) Inventor: Jesse Michael Schneider, Chandler, AZ (US)

(73) Assignee: Not So Forgetful LLC, Chandler, AZ (US)

( * ) Notice: Subject to any disclaimer, the term of this patent is extended or adjusted under 35 U.S.C. 154(b) by 0 days.

(21) Appl. No.: 16/287,593

(22) Filed: Feb. 27, 2019

(65) Prior Publication Data

US 2019/0197631 A1 Jun. 27, 2019

Related U.S. Application Data

(62) Division of application No. 15/282,787, filed on Sep. 30, 2016, now Pat. No. 11,170,451.

(Continued)

(51) Int. Cl.
*G06Q 50/00* (2012.01)
*G06Q 10/1093* (2023.01)
(Continued)

(52) U.S. Cl.
CPC ......... *G06Q 50/01* (2013.01); *G06F 16/9535* (2019.01); *G06Q 10/1095* (2013.01); *G06Q 30/0631* (2013.01)

(58) Field of Classification Search
CPC combination set(s) only.
See application file for complete search history.

(56) References Cited

U.S. PATENT DOCUMENTS

2009/0265319 A1\* 10/2009 Lehrman ............. G06F 16/9535
2011/0237226 A1\* 9/2011 Dhuna ............... H04M 1/72412
455/414.1

(Continued)

FOREIGN PATENT DOCUMENTS

AU 2010100893 A4 \* 9/2010 ........... G06F 19/323
KR 20100071751 \* 6/2010 ............. G06Q 50/22

OTHER PUBLICATIONS

A. Zmily, et al. "Alzheimer's Disease rehabilitation using smartphones to improve patients' quality of life," 2013 7th International Conference on Pervasive Computing Technologies for Healthcare and Workshops, 2013, pp. 393-396 <https://ieeexplore.ieee.org/document/6563975?source=IQplus> (Year: 2013).\*

*Primary Examiner* — Jerry O'Connor
*Assistant Examiner* — Michael R Koester
(74) *Attorney, Agent, or Firm* — Cameron LLP

(57) ABSTRACT

Users invite friends and family to participate in an automated memory reminder and personal social network system. The personal social network comprises a smart mobile communications client device and administration panel trending algorithms called Not So Forgetful (NSF). NSF distinguishes by assisting in light and heavy reminders. NSF helps users to remember important dates and get recommendations such as events, gifts and/or social engagements with a reminder system personal to the users and runs on a processor of the smart client device. A cloud-based administration panel server, databases and search engines assist in heavy reminders with an individual diagnosed with a memory deficiency with recorded memories. For light reminders, there is a list for things to do varying from week (Continued)

to week. Algorithms utilize NSF network internal and external data to develop top trending gift, social engagement lists and a depository supporting trending/memory assistance algorithms.

10 Claims, 12 Drawing Sheets

Related U.S. Application Data

(60) Provisional application No. 62/236,607, filed on Oct. 2, 2015.

(51) Int. Cl.
    *G06Q 30/0601*     (2023.01)
    *G06F 16/9535*     (2019.01)

(56) References Cited

U.S. PATENT DOCUMENTS

| | | | |
|---|---|---|---|
| 2014/0279205 A1* | 9/2014 | Ganesh | G06Q 50/01 705/26.7 |
| 2015/0039464 A1* | 2/2015 | Seetharam | G06Q 30/0633 705/26.8 |
| 2015/0248651 A1* | 9/2015 | Akutagawa | G06Q 50/01 705/7.19 |
| 2015/0278857 A1* | 10/2015 | Moon | G06Q 30/0252 705/14.5 |

* cited by examiner

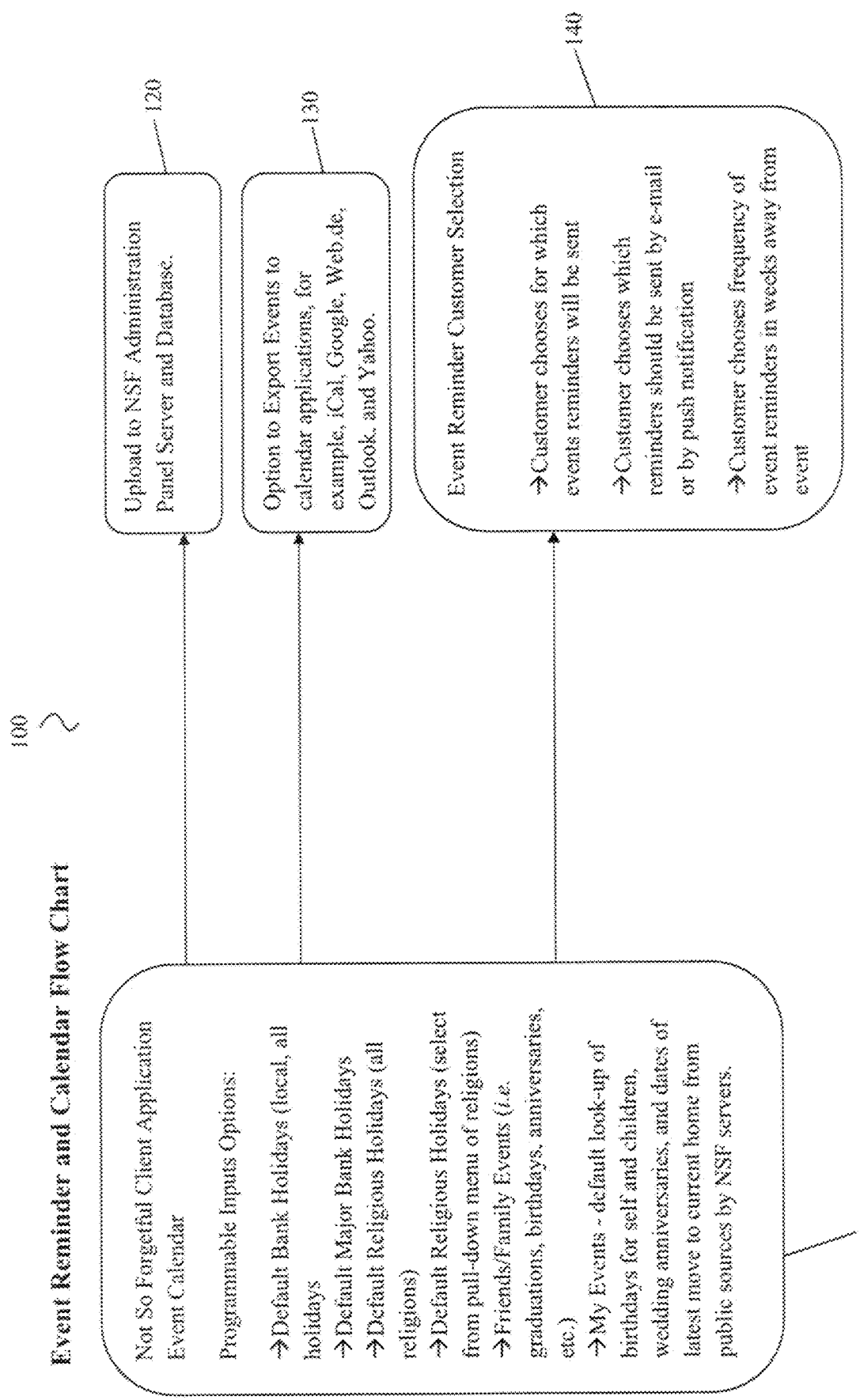

Not So Forgetful Gift Registry, Gift Depository and Trending Database

→ Gift registry is a record of gifts to be purchased from different sellers in advance of an event. The gift depository is a record of globally past gifts already purchased for a given user. Gifts that are in a gift depository or a "dislike list" for a given user profile are filtered out of future gift recommendation lists for that user. Gift purchase or gift depository data is added to the trending database under control of the administration panel of the NSF server.

→ NSF Trending database records all gift purchase data matched with recipient's demographics → NSF "Group Present"- Allows Inviter to choose a gift (with feedback from group through messaging) with group to purchase → NSF "Personal Registry"- Allows User to create a personal gift registry for events (e.g. wedding, baby) with specific interests and products. User Contacts can choose to buy gift and these gifts are excluded from list.

→ Information stored on NSF database

→ Learns from external APIs and internal data

Go to Fig. 2A 230

Trending Data from External APIs and Affiliates: Amazon, Travelocity, Seatgeek, Toys.com, Ebay, etc.

Examples

| Event and Relationship | Age | Gender | Location | Religion | Relevant Interests (Likes and Hobbies) | Gift Search Keywords | Affiliate Links 1 | Affiliate Links 2 |
|---|---|---|---|---|---|---|---|---|
| 25th anniversary (wife) | 57 | F | NY, NY | Christian | Gold, Jewelry, Travel, Hawaii | Gold, Necklace, Bracelet, Hawaii, Vacation, wife 25th Anniversary | Blue Nile → Jewelry selection | Travelocity → Hawaii vacation for two |
| Baptism (nephew) | Newborn (1 month) | M | Denver, CO | Christian | Not available | Boy Baptism, Prayer plaque | Amazon → prayer plaque, cross | Amazon → baptism frame |
| College Graduation | 22 | F | Los Angeles, LA | Not Available | Fashion, favorite color red, Environmental Causes | Hybrid Car, Red | Carsdirect.com → Red Toyota Prius | Carsdirect.com → Red Honda Civic Hybrid |

FIG. 3

APPARATUS AND SYSTEM FOR PROVIDING REMINDERS AND RECOMMENDATIONS, STORING PERSONAL INFORMATION, MEMORY ASSISTANCE AND FACILITATING RELATED PURCHASES THROUGH AN INTERCONNECTED SOCIAL NETWORK

This application is a divisional of U.S. patent application Ser. No. 15/282,787 filed Sep. 30, 2016 which claims the benefit of priority to U.S. Provisional Patent Application Ser. No. 62/236,607, both patent applications having the same title and of the same inventor and incorporated herein by reference as to their entire contents.

TECHNICAL FIELD

The technical field of the invention relates generally to data processing, and more specifically to a system of storing information and sharing information with a social network about user events, interests, likes and dislikes, preference settings and providing custom personalized reminders for user defined events along with recommendations for items to be purchased for a specific user for a specific event. Information to aid in the recommendations is stored in distinct databases programmed by the user for their demographics, calendar related events (holidays and personal events), interests, as well as administrator-controlled checklists and memories stored in the form of audio, video and pictures.

BACKGROUND OF THE INVENTION

Mobile and personal computer software applications that provide calendar functions and reminders are well known in the art. Calendar applications on mobile devices such as, for example, Google calendar and iCal (available for Apple mobile device) may be used to enter information about upcoming events, store event data on a network database, and provide the user with reminders of upcoming events. Several patents have been issued and patent applications published in the field of calendar applications and electronic notifications or reminders. U.S. Pat. No. 6,728,530 to Heinonen et. al. provides a system of displaying calendar data on a mobile device where the data may be synced with a network database and updated or accessed from other devices. U.S. Pat. No. 7,334,000 to Chhatrapati et. al. discloses a system of scheduling task and event reminders for maximum efficiency by categorizing tasks and events by priority to spread out reminder deliveries across time and reduce spikes in delivery volume. U.S. Pat. No. 7,363,345 to Austin-Lane et. al. relates to a system for delivering electronic notifications and selecting a delivery mechanism based on the user's availability. U.S. Pat. No. 8,594,641 to Neilsen discloses a system of providing call reminders on a mobile phone. Published U.S. Patent Application No. 2010/0235214 U.S. Ser. No. 12/403,510 filed Mar. 13, 2009) to Wood et. al. and Published U.S. Patent Application No. 2011/0154207 (U.S. Ser. No. 13/040,518 filed Mar. 4, 2011) to Bedingfield Sr. disclose further calendar database systems that allow users to create events and provide and update reminders of upcoming events. Published U.S. Patent Application No. 2014/0040919 (U.S. Ser. No. 13/562,756 filed Jul. 31, 2012) to Arora et. al. describes creating article data for an event and associated reminders such as for an upcoming birthday event. Associated articles may comprise making or buying a birthday cake, obtaining birthday party decorations and buying a suitable present such that a reminder is communicated before the event to make, order or otherwise obtain the article in time for the event.

Many online social networks also provide calendar and event notification functions. Facebook, for example, allows users to create events and share event details with friends. Facebook also provides reminders of upcoming events and birthdays, and can be configured to send notifications by e-mail or push notification. LinkedIn, for example, may notify a user when a contact has a work anniversary and remind the user to congratulate that contact. Meetup (a local social network) also allows local users to create local events and provides reminders and recommendations for upcoming events based on the local user's interests. However, these social networks do not provide, for example: automatic gift and/or social engagement recommendations in advance or just before events, do not persist in repetitively providing reminders, provide reminders for holidays or specialized events such as birthdays for children just becoming teenagers, provide group gift and/or social engagement invitations (such as for members of a social club) and purchasing possibilities from multiple purchasing affiliate sites or alternative purchasing sites.

Systems for providing automated, personalized recommendations for obtaining information based on a user's preferences and learning from in-use data are also known in the art. For example, U.S. Pat. No. 8,869,037 to Rose discloses a system for visualizing and rating a user's preference for news articles and other media content based on the positive and negative preferences of that user and other users. But this system fails to provide automated recommendations for a small social network, for example, of family or group of close friends.

Known calendar applications do not provide the additional functionalities of personalized gift and/or social engagement recommendations for contacts in a user's network or other personalized purchase recommendations based on specific personal information about a user or an event. Furthermore, large social networks such as Facebook and LinkedIn are generally not used to: store user interests, location, demographic data (sex and age) or religious information, communicate gift and/or social engagement purchases to other social network users, create gift and/or social engagement registries for upcoming events, create gift and/or social engagement depositories for recording gift and/or social engagement purchases or develop trending databases based on demographic and past purchase data for creating a list of most popular gift and/or social engagements for a given demographic, where known social networks are usually quite large with many acquaintances and professional contacts, not focused on a small network of family or close personal friends. Thus, there is a need for an automated calendar and reminder application to provide event reminders and personalized gift and/or social engagement recommendations for contacts in a user's small, personal network of family and close personal friends that may utilize the data stored in larger social networking, purchasing and calendar applications to automatically make recommendations personalized to a user yet provide demographically popular recommendations developed from a larger population than to a family or group of close personal friends.

SUMMARY OF THE INVENTION

This summary is provided to introduce a selection of concepts. These concepts are further described below in the Detailed Description. This summary is not intended to identify key features or essential features of the claimed subject matter, nor is this summary intended as an aid in determining the scope of the claimed subject matter. As used herein, the term "social engagement" shall mean an event, appointment, arrangement or activity such as, for example, a dinner reservation, a concert, a hike, a sporting event, or any other activity that may be recommended for a user of the present invention. As described in further detail below, gift and/or social engagement recommendations include both tangible items that are recommended for purchase as a gift for another individual and recommended activities or social engagements that the individual may enjoy in connection with a particular event such as, for example, a birthday or anniversary. In other embodiments of the present invention, the term "social engagement" may also include personal tasks such as medical appointments. It should be understood that the terms "gift registry," "gift depository," and "gift recommendation" as used herein and in the Figures shall have the same meaning as "gift and/or social engagement registry," "gift and/or social engagement depository," and "gift and/or social engagement recommendation." The term "gift" as used herein and in the Figures may include social engagements or activities and should not be construed as being limited to tangible goods.

The present invention provides an automated reminder and recommendation system coupled with a social networking function intended for close friends and family wherein interests, religion, sex, age and other confidential data of a user may be supplemented with data of a larger population of a similar demographic and collection of interest to output, for example, a top ten, most popular gift and/or social engagement list for a sixteen year old woman and an ability to automatically obtain a selected gift and/or social engagement at a selected price point for the sixteen year old from a purchasing affiliate or other purchasing source in advance of, for example, a birthday event. The invention allows a user to input important events such as birthdays, anniversaries, graduations, religious events, children's events, and other personal events and choose which important events are shared with friend and family contacts in a small social network. Event information is stored on an event database NSF server via an administration panel and is accessible through a mobile device application. Calendar information developed at the NSF server via a client NSF application may also be automatically linked with iCal, Web.de, Google, Yahoo or other mobile calendar applications with the user's permission. The invention may automatically load and update religious and national holidays based on a user's location, for example, identified by a Global Positioning System and preferences, for example, collected from the user or shared by a demographically similar population. Contacts may be automatically added to a user's social network by automatically importing information from a user's mobile device with the permission of the user or added manually by the user. Users may enter a current mailing/shipping address to facilitate delivery and transmittal of gift and/or social engagements through the system. Once users are registered, they are asked to enter demographic information and personal interests and hobbies. Once user information is entered through a user's mobile device; data is stored in a user data database of a central NSF database at an NSF administration panel server comprising other related databases such as a gift and/or social engagement registry database, a gift and/or social engagement depository database, a purchasing affiliate database and the administration panel controller of the central NSF application database server.

The invention may provide automated reminders of other users' important events along with personalized gift and/or social engagement recommendations for events in the user's network through e-mail or push notifications, periodically or according to a predetermined schedule input by a user. Gift and/or social engagement recommendations (also through purchasing affiliate item links) may also be viewed through an NSF application running on the user's mobile device processor and utilizing device features such as GPS, touch-screen display, keyboard and other inherent features including the ability to automatically retrieve data from public sources and specific data through links with purchasing affiliate sources. The invention may receive trending data from third-party purchasing affiliate applications and build a trending database at the central NSF application database, for example, based on demographics. Trending data provides information on frequently purchased gift and/or social engagement items categorized by event and recipient demographics. Trending data may be influenced by travel recognized by movement of a user's client device, for example, from Germany to New Jersey to the Fiji Islands and so assist a trending algorithm to make a gift or social engagement recommendation. Trending information is updated and stored on the NSF application's central database and, depending on the timeliness of the trending data, is periodically deleted and synched with data locally stored via an NSF client application. Personalized gift and/or social engagement recommendations are provided based on third-party trending data combined with user demographics, interests, likes, dislikes, hobbies, search history, and purchase history. Gift and/or social engagement recommendations are further filtered based on user feedback and a system of automatically tracking gift and/or social engagement already purchased for the gift and/or social engagement recipient (gift and/or social engagement depository). Links are provided to recommended gift and/or social engagements that may be purchased from purchasing affiliate vendors and, if appropriate, from non-affiliated vendors, for example, for special, one of a kind gift and/or social engagements. When a gift and/or social engagement is purchased through the system, purchase data is stored on the database and used to further refine the gift and/or social engagement recommendation algorithm and the purchased gift and/or social engagement is stored in the depository.

The Invention distinguishes between a "gift and/or social engagement registry" and a "gift and/or social engagement depository" database. A gift and/or social engagement registry provides a registry which enable recording of gift and/or social engagement recommendations for future events while a gift and/or social engagement depository records user purchases of gift and/or social engagements that have already been made. As used herein, the term "gift depository" or "gift and/or social engagement depository" shall means a record of globally past gifts already purchased for a given user of the present invention. For example, both a "gift and/or social engagement registry" and a "gift and/or social engagement depository" may be used to obtain trending data. Moreover, the gift and/or social engagement depository may be broken down into purchases for one's self versus purchases for others and, further, may be broken down into purchases that have a finite expiration such as a ticket to a concert, flowers (which have a finite life and include pharmaceutical or food items versus a gift and/or social engagement that does not have a finite expiration such as clothing). Flowers, dinner, travel or hotel reservation recommendations may be automatically adapted to remind the user to provide a rating of the product/service provider for future events involving same. For example, if Flowers-.com does a particular good job of arranging and providing fresh, long-lasting flowers for an event, the user may rate that purchasing affiliate on a rating scale or via a predetermined survey which data may be stored personally to the user or combined with other user ratings to provide a rating for the purchasing affiliate. The present invention further permits automated group invitations for big event gift and/or social engagement purchases (like a lease of a new car as a wedding gift and/or social engagement where a number of invitees to the wedding may contribute to a purchase of a new car lease). Such a group purchase may be associated with a wedding event "wish list" registry, such that invitees to the wedding may be automatically interconnected with a social network formed for the wedding as well as permit automatic trending of gift and/or social engagement data for wedding events from external APIs.

In further embodiments of the reminder and recommendation system of the present invention, the system may also provide memory assistance and related recommendations to individuals in need of occasional light reminders and to those with heavy memory issues. For example, for light reminders, there may be compiled a "Honey-Do" checklist for things to do today such as grocery shopping, dry cleaning, banking, purchase of gas for the automobile, etc. provided via the NSF administrator panel, for example, for a typical Saturday of a user. The checklists may also provide recommendations for items to be purchased online or in person (toilet paper and other items through, for example, Amazon.com or the local grocery store).

Those with more severe memory issues could be reminded with "heavy" recommendations. For example, "heavy" reminders may include repeated daily tasks such as taking medications, preparing and eating meals, or shopping for food or household supplies given with recommendations from purchasing affiliate sites. (Preparing affiliate as used herein may be defined as a brick and mortar or on-line location where gift and/or social engagements, tickets, reservations, leases and other forms of gift and/or social engagements (either in the form of products or services) may be obtained and where the purchasing affiliate has specially arranged with the present social network, referred to herein as Not So Forgetful (NSF), to permit access to its products/services and special offers. Shopping reminders may be linked to recommendations for online vendors, coupons, and special offers from purchasing affiliate or outside the network sites. The "heavy reminder" feature of the invention may automatically provide personal and family reminders, display user-selected life memories/photographs, and, for example, assist the user with recognizing photographs of important family members and friends and even the user's own photograph. Face and voice recognition through NSF smart client devices, for example, may be optionally and automatically coupled with audio, pictures and video recordings as well as text (such as a biography of a specific person) to assist the user to remember specific people, places and events as well as recommendations on what must be done to prepare for special occasions (for seniors) such as fiftieth wedding anniversary functions.

For the not so forgetful calendar, there is a way provided to import external events as well as give feedback to accept the appointment or acknowledge the event. For example, the system may be linked to external calendars to provide users with reminders of medical/dental appointments (for instance, from an Outlook e-mail invitation) for acknowledgement. Public source databases may be consulted automatically for events such as a user's birthday or wedding anniversary if not input by at the NSF client. The event invitation (for example, a medical appointment) can be automatically accepted by the NSF client (with persistent reminders to its user) and, at a set end point before the event, a reminder is again automatically sent. If a prescription is made from a doctor through electronic means, it may be entered into the calendar and a reminder email sent from the NSF application client with a purchasing affiliate link(s) to purchase the medicine. If there are repeated doses, this is logged into the calendar and reminders are sent with recommendations where to purchase the medicine through purchasing affiliate accounts or through known discount pharmaceutical applications.

The present invention may be implemented as a client application on any intelligent (or so-called smart) device such as a mobile phone, a desktop or laptop computer, a tablet, a smart watch, or smart glasses. Most smart devices comprise cameras, touchscreens, accelerometers, biometrics data collection, global positioning systems and other features which may provide input to an NSF client application gift and/or social engagement recommendation or event alert. These NSF client devices may be connected to a link to vehicle smart applications including smart televisions and smart vehicles (such as BMW's connected drive) or smart homes to provide reminders also through external audio and video devices and displays. Most importantly, the typically mobile application is administered via an NSF administration panel and database server which communicates with purchasing affiliate databases, on-line demographic database servers, social networking servers and calendar servers among other servers in the internet cloud which may assist in providing automated reminders, recommendations, storing information, providing memory assistance and facilitating purchases through the present social network, referred to herein as Not So Forgetful.

BRIEF DESCRIPTION OF THE DRAWINGS

FIG. 1 is a flowchart depicting an overview of the present invention's calendar, event and notification selection functions via an NSF client device and an NSF administration panel cloud server.

FIGS. 2A, 2B and 2C are respective flowcharts depicting the event reminder and gift and/or social engagement notification algorithms (also referred to herein as a trending algorithm) of the present invention via an NSF smart client device and an NSF administration panel cloud server. FIG. 2A is a flowchart for "No So Forgetful Gift Recommendations: Automated Reminders and Recommendations" showing a flow from event reminder function 210 to demographics database function 220 to Interests; Likes, Dislikes and Hobbies function 230 to FIG. 2B function 290. FIG. 2A also shows event reminder function 210 leading to Push or Email notification function 240 to links to websites function 250 to assistance, GPS address and costs function 270. FIG. 2B is a flowchart for showing a two-way connection to FIG. 2A for developing a trending database under control of an NSF administration panel server trending algorithm and database 290. Trending data is input from external API's function 280. A return to FIG. 2A is via function 260 with external API data combined with internal NSF data ("demographics of recipient)." FIG. 2C is a flowchart for a "Not So Forgetful Gift Registry and Trending Database" resulting in Top Ten Trending function 225 ("Top ten trending for recipient profile . . . ") leading to a recommendations step 235 where recommendations are sent to a user.

FIG. 3 provides examples of automatic gift and/or social engagement searches for three different user profiles and events typically via the NSF client application with the assistance of the NSF administration panel.

DETAILED DESCRIPTION

Figure 2A:
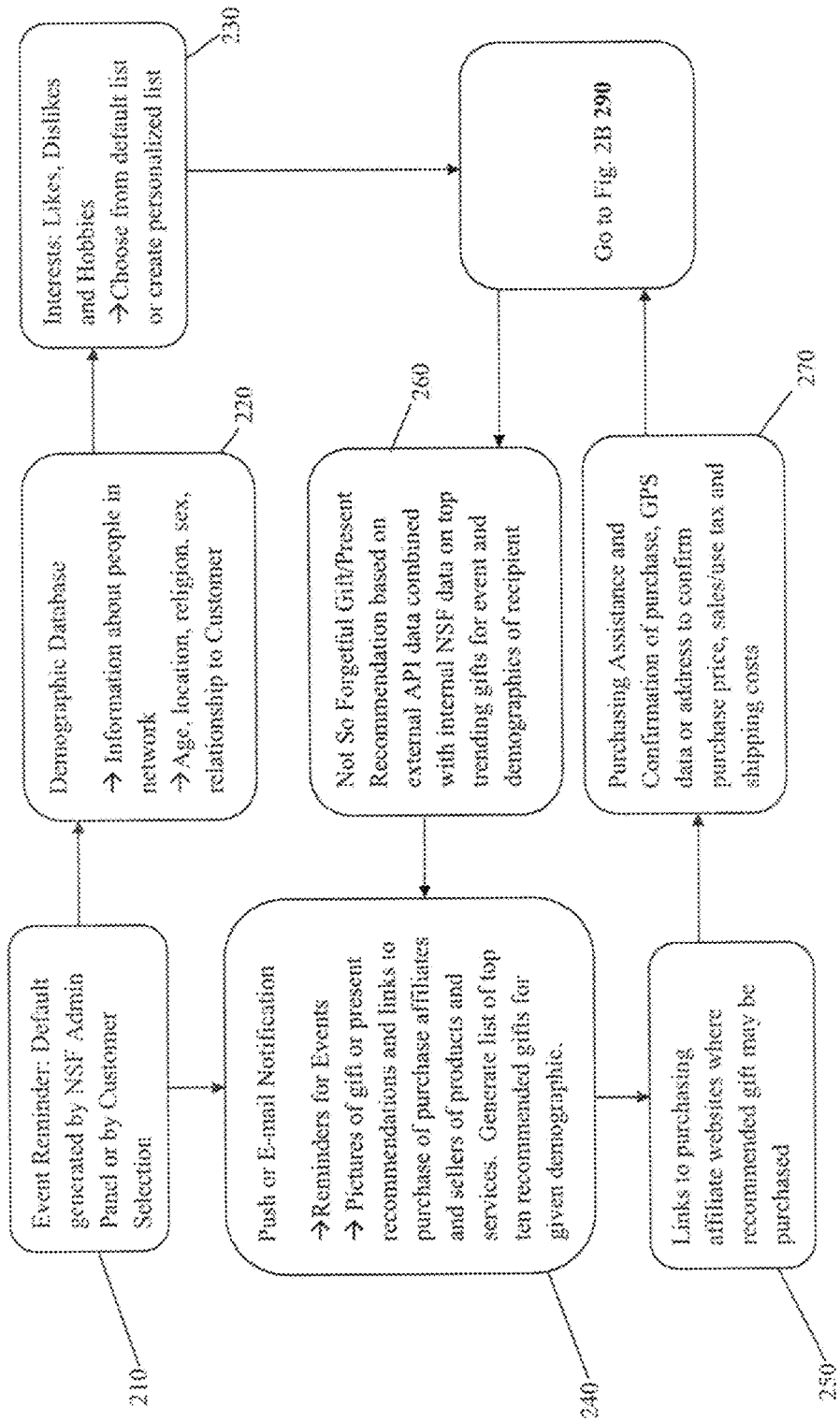

Referring to FIG. 1, the present invention provides an event reminder and calendar function 100 via, on the one hand, an NSF client application running on a client device personal to an NSF user and, on the other hand, an NSF central administration panel server and related databases for automatically generating data in support of the event reminder and calendar function 100: (see FIG. 4 for an NSF system diagram). Referring to function 110 of the NSF client and NSF server, the user may select lists of pre-programmed events or request the NSF server to populate a database event calendar from local (national or regional) holidays (for example, utilizing global positioning system data), major bank holidays, religious holidays for all religions (which may be automatically generated once the NSF client user enters their religion from a pull-down menu or manually enters their religious choice), or friends/family events imported from client devices of other NSF members of the user's personal friends and family network with the permission of the NSF member. Personal events for a user may also be automatically selected by the NSF server based on the user's interests and likes. Automatically selected personal events may be recommended to the user per event reminders. Events from the user's selected list are added to the user's calendar manually and identified as "my events" which may involve a manual entry or a default look-up of birthday events from data entry of the user's children, their spouse (for wedding anniversary, dates of move to current address many of which may be obtained from public web-based services, for example, via the NSF administration panel server. Referring to function 120, a user's personal event data is stored in the NSF Server and database and also locally on the NSF Application on the user's smart device. Referring to function 130, the NSF client device user may have the option to import and export events between the present invention's calendar and external calendar programs such as iCal, Outlook, Google, Web.de or Yahoo, among other known calendar systems accessible by the user's client device and NSF client application. As explained above, for personal events, not manually entered by the user such as their birthday or anniversary or children's birthdays, whatever information is input by the NSF user via their NSF client application may be uploaded at function 120 to public data services given, for example, the user's or child's name, age and location of birth. Similarly, a school/college/university web page may be consulted for a graduation ceremony date, place and time (if sufficient information is input) or a wedding anniversary may be identified from a public source given the location and names of the married NSF users.

Referring now to function 140, for events of friends and family of a user's NSF network, the user may manually input information pertaining to an event or receive event information that is shared by contacts in the user's social network. A user may select how often reminders are sent, how long before an event to receive a reminder, for which events to receive reminders, acknowledge receipt of the reminder and whether to receive reminders by e-mail, push notification, or by other means available on various other intelligent devices besides a personal NSF client device such as, for example, video playback on a smart television, or audio notification on the speakers of a vehicle either directly through a smart vehicle system through a wireless data connection such as Bluetooth or via a smart home entertainment system which may communicate with the NSF application client device. Once event and calendar settings are entered, the user will receive automated reminders of selected events (for example, by e-mail or push) accompanied by customized gift and/or social engagement recommendations (downloaded from the central NSF server) for people in that user's social network who celebrate the selected events based on the NSF social network member's demographics (for example, sex, age and biometrics), likes, dislikes, interests, and hobbies of the gift and/or social engagement recipient. An NSF client application user may choose the frequency of the event reminders, for example, in weeks away from such an event as a wedding or graduation. Gift and/or social engagement recommendations are automatically provided by the NSF central server, such as a top ten gift and/or social engagement list for a given user demographic, along with purchasing affiliate links or other links where recommended gift and/or social engagements (products or services) may be timely purchased or delivered to a predetermined address in advance of an event (such as flowers to a user's residence in time for a holiday or anniversary or to a funeral home in time for a funeral).

The present invention includes a personal social network (hereinafter, the NSF personal network) intended to be used with a small group of friends and family rather than include all contacts of a user in, for example, their Outlook contact list) but rather selectively included and imported by the user into the NSF client application and manually or automatically supplemented if certain data is not known to the user such as birthday from the NSF server. The NSF personal social network function allows users to send individual and group messages to social network members and to permissibly share events, profiles, personal information and gift and/or social engagements among NSF users of an NSF personal user social network. Users may create personal profiles and enter data for their personal contacts (for example, friends and family) or request that certain data be automatically imported with permission of an NSF member through the NSF server or its communication with public sources and invite those NSF user individuals to join the personal user NSF social network. A profile created on behalf of a user's personal contact will be kept private until the NSF server is notified that the contact accepts an invitation to join an NSF user's personal social network of friends and family. An invited contact may also refuse the invitation and request that personal information be deleted or rendered inaccessible from the NSF administration panel server. Users may share information by forwarding profiles, likes, hobbies, and events to other users in their NSF personal social network. The recipient of an offer to share information may either accept or deny. Users may choose whether and with whom to share their personal information and what information they are willing to share including demographics, likes, hobbies, event, and interest that are stored on the NSF administration panel cloud server. The NSF personal social network for a given user may also include sub-groups such as friends, family, close friends, etc. such that the user may select different sharing and privacy controls for each NSF user sub-group. Users may enter mailing/shipping addresses to facilitate sending and receiving gift and/or social engagements of products and services. Mailing/shipping addresses may be kept private and hidden from other users but permissibly provided to purchasing affiliates and other sellers of products and services. Users may also create profiles for their under-aged children to enable gift and/or social engagement recommendations for the child's important events. A child's profile may be preferably controlled by an adult such as the child's parent or other relative until the child reaches a predetermined age such as 18. The adult supervisor of the child's profile may also have an option to make the child's profile invisible except for the sending of event reminders and gift and/or social engagement recommendations.

Referring to FIG. 2A, there is shown a flowchart for databases 200 including demographic database (function 220) pointing to "Interests: Likes, Dislikes and Hobbies" function 230, in turn pointing to "Not So Forgetful Gift Registry, Gift Depository and Trending Database (function 290, FIG. 2B "under control of the administration panel of the NSF server") for NSF gift, event and/or social engagement recommendation generation including automated reminders for gift, event and/or social engagement purchases (step 210) and automatic generation of product and service gift, event and/or social engagement recommendations (step 240). Note that "Generate list of top ten recommended for given demographic" may also link FIG. 2A to FIG. 2C "Top 10 Trending" step 225 of FIG. 2C. Referring first to function 210, there is shown a function of event reminders which may be provided in a default mode (for example, once a religious holiday such as Christmas is entered. Christmas or other holiday, concert and sports event reminders and gift, event and/or social engagement generation may be automatic if, with respect to a Christian holiday, the NSF social network member selects Christian as his religion). A Default Event Reminder may be generated by an NSF Administration Panel Server or by NSF data input on a smart mobile client device. The customer selection of an event such as an extraordinary choice of religion may result. For example, a particular holiday may be celebrated in different ways in different localities and so an NSF Administration Panel server communicating with one or more search engines may be required to perform research into the particular holiday according to the location of the smart mobile client device of its user. This is an example of what is meant by customer selection in function 210. Alternatively, the NSF smart mobile client device user and member of a personal NSF network may select an event and manually enter the event (if not already stored in memory), for example, after receiving a wedding and reception invitation from a personal NSF social network member. The NSF client device may communicate with the church or other wedding location or performer/planner of the wedding service via the NSF administration panel server as will be further described with reference to FIG. 4, so that other wedding invitees may be identified and the wedding data shared among all wedding invitee members of an NSF personal network. Arrows or directions shown, for example, connecting functions 210, 220, 230, 290 (to FIG. 2B), 260 and the like are suggestive and merely representative of a functional flow. For example, demographic database 220 may communicate with event reminder 210 to update further information collected, for example, with reference to a religious event previously not recognized by event reminder function 210. Demographic database function 220 comprises information about people to network and age, location, religion, sex, relationship to customer; see, for example, FIG. 3. Event Reminder function 210 connects to Push or E-mail Notification 240 comprising: reminders for events, pictures of gift or present recommendations and links to purchase affiliates and sellers of products and sellers and "Generate list of top ten recommended gifts for given demographic". Function 240 leads to function 250 comprising links to purchasing affiliate websites where a recommended gift may be purchased. Function 250 in turn leads to function 270 comprising purchasing assistance and confirmation of purchase, global positioning system (GPS) location data or address to confirm purchase. The flowchart for databases 200 of FIG. 2A is connected to and continues into the flowchart 205 of FIG. 2B, where the external trending data function 280 and the trending database, gift, event and/or social engagement registry, and gift, event and/or social engagement depository function 290 are depicted in connection with the functions shown in FIG. 2A. More particularly, function 280 comprises trending data from external application programming interfaces (API's) and affiliates of Not-So-Forgetful, LLC for forwarding to function 290 of FIG. 2B.

Referring to Demographic Database function 220, an NSF user, via their NSF smart client application device may enter personal demographic background information such as age, sex, location, religion and occupation. Via Interests function 230, the same NSF user may enter hobbies, interests, likes and dislikes into the invention's NSF client device and permit the list to be uploaded and stored at an NSF administration panel server database (for example, for use in developing a gift, event and/or social engagement registry and/or a trending database, function 290 depicted in FIG. 2B). Users may also enter information at functions 220, 230 about contacts in that user's social network including demographic information, interests, likes and dislikes and personal or family relationship to the user with the permission of the contact (if not publicly known) or for a child. The interests, hobbies, likes and dislikes and events central NSF database of the present NSF invention may provide users with a predefined list of interests, likes, dislikes, hobbies and events automatically generated for the demographic of the user or intended recipient at gift, event and/or social engagement registry and/or a trending database function 290 depicted in FIG. 2B. This list may be stored on the NSF cloud server. Users may select likes, dislikes, events, hobbies and interests from the predefined list or add custom interests to the list (which may be uploaded via function 220 to the NSF Administration Panel Server as a part of demographics data). The NSF application smart mobile client device user may also prioritize events, interests and hobbies and identify which items are the user's favorite or the most important to the user.

In addition to demographic information and interests entered into a user's NSF mobile client application device and uploaded to the NSF Administration Panel Server via functions 220 and 230, location and travel data saved on the user's device may be optionally shared with the NSF application and uploaded from the client application device to the NSF Administration Panel Server. Location and travel data may be obtained by the smart mobile client application device, for example, through GPS, cell tower triangulation, or manual entry. In some embodiments of the present invention, location and travel data may influence or be incorporated into gift, event and social engagement recommendations. In further embodiments, the user may optionally share other data files stored on the NSF smart mobile client application device such as images, sound recordings, videos and other media to be incorporated into gift, event and social engagement recommendations. For example, a user may see items she likes in a window display, take a photo, and upload that photo to the NSF Administration Panel Server, which would use image/object recognition to search for similar items to recommend to the user's contacts as a gift for that user; see function 240 (FIG. 2A), "pictures of gift or present recommendations."

The user's selection of likes, dislikes, interests and hobbies (function 230) is stored on the invention's NSF smart mobile client and NSF administration panel server database along with trending data received from external purchasing affiliates that include several retailers, online merchants, travel services, and other vendors. The NSF administration panel server may learn from external API's and internal (and externally obtained) data, for example, from public sources over the internet via at least one search engine. This function is identified in the flowchart 205 of FIG. 2B as function 280 and is related to function 260 of FIG. 2A where trending data may be searched for and obtained from external API's and purchasing affiliates of Not-So-Forgetful, LLC, (for example, for children's gift, event and/or social engagements and for difficult to find items such as no longer available china patterns, silver patterns, gift, event and/or social engagements such as porcelain statues, art and the like.

Figure 2C:
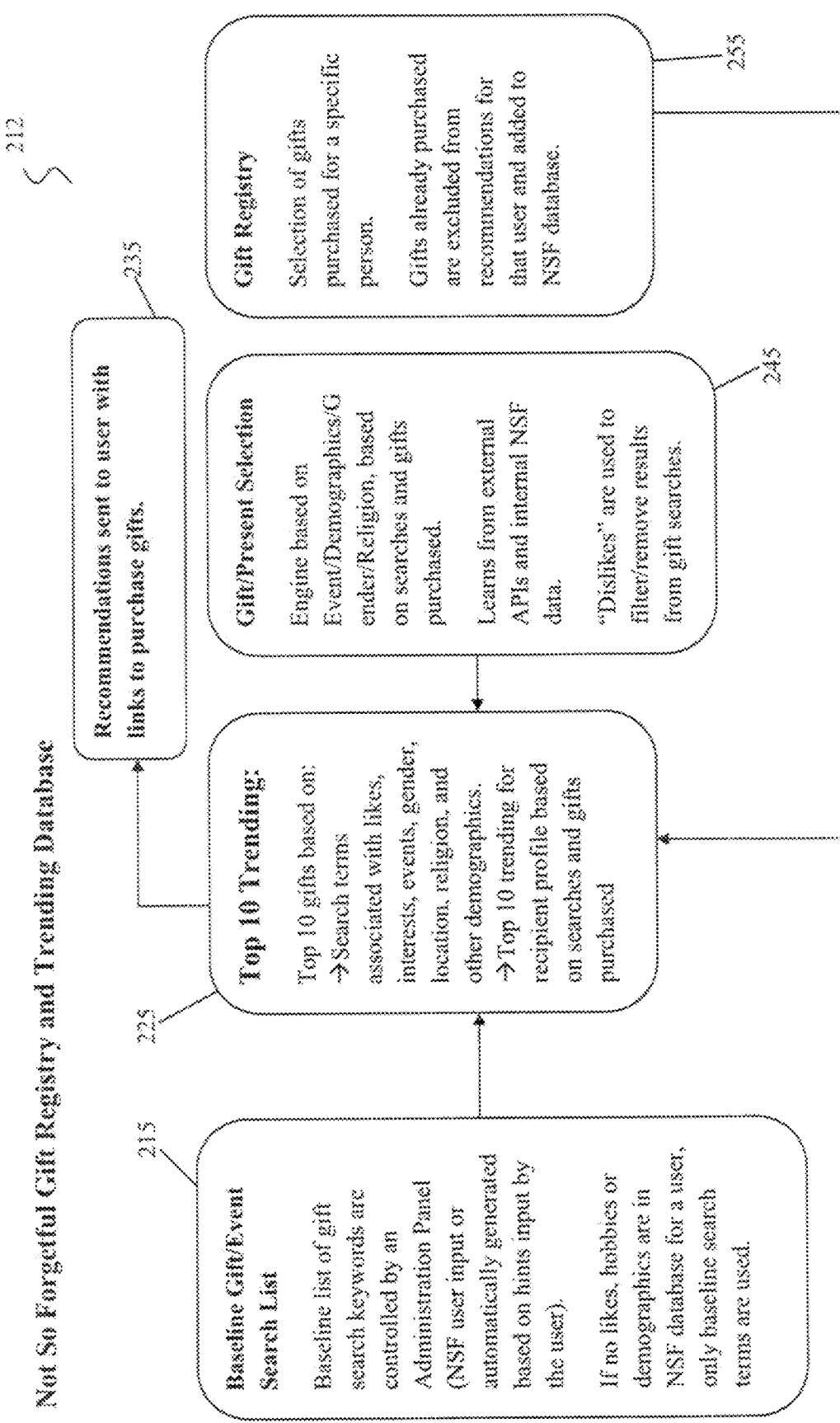

Personal information about each individual user and information about particular categories of events is used to generate gift, event and/or social engagement search keywords (function 215 of FIG. 2C). If a user has not entered any information about hobbies or interests, search keywords based only on demographic data may be used. If no demographic information or interests are available, baseline keywords selected by an administration panel for particular events and recipient demographics may be used to search for gift, event and/or social engagements. If no demographic data or interests are provided, a user may also initiate a manual gift, event and/or social engagement search by entering information about the intended recipient of a gift, event and/or social engagement such as demographics and interests and information about the event for which the gift, event and/or social engagement will be bought. This information is sent to the NSF cloud server and used to generate gift, event and/or social engagement search keywords. Affiliate sites have databases comprising gift, event or social engagement data that are searched using the generated keywords, and top gift, event and/or social engagement recommendations are provided based on trending data and user-specific data. Gift, event and/or social engagement recommendations are filtered through a "depository gift and/or social engagement registry" where gift, event and/or social engagements already purchased for a particular user are tracked and may be excluded from future recommendations to avoid duplicate purchases. When a gift, event and/or social engagement is purchased from a link provided by the system, information about the purchase and the recipient is stored on the database and added to the depository, the trending list as well as the registry. Gift, event and/or social engagement recommendations are further filtered by dislikes stored in the recipient's interests database. Items related to a recipient's dislikes will be removed from recommended gift, event and/or social engagements.

Gift, event and/or social engagement purchase data of a gift, event and/or social engagement depository is matched with the recipient's demographics and stored on the application's NSF cloud-based administration panel server to enable the invention to continually learn from internal (and external to the NSF application) application data. Users may also bookmark and flag items of interest through the NSF client application and also mark items that the user does not wish to purchase. Flag, bookmark, and gift, event and/or social engagement search data matched with user demographics is stored on the application's NSF cloud-based administration panel server and may be incorporated into the gift, event and/or social engagement recommendation algorithm (function 260 of FIG. 2A). This function 260 comprises a Not So Forgetful gift/present recommendation based on external API data combined with internal Not So Forgetful data on top trending gifts for event and demographics of recipient for input to push or e-mail notification function 240. Dated gift, event and/or social engagement purchase data older than a certain predetermined time such as three years (and depending on the product/service or social engagement) may be discarded and not used in trending and learning. Gift, event and/or social engagement recommendations are also filtered based on holidays, events, user-specific demographics, interests and dislikes. The cloud-based NSF administration panel server receives and stores trending information from third-party application programming interfaces (API's) at function 280 depicted in FIG. 2C which are passed to function 290. Trending information may comprise data on gift, event and/or social engagement searches, selections, bookmarks, flags and purchases matched to demographics of the user.

Furthermore, referring to FIG. 2B, in function 290, identified as a Not So Forgetful Gift Registry, Gift Depository and Trending Database function, wherein a gift registry is a record of gifts to be purchased from different sellers in advance of an event. The gift depository is a record of globally past gifts already purchased for a given user. Gifts that are in a gift depository or a "dislike list" for a given user profile are filtered out of future gift recommendation lists for that user. Gift purchase or gift depository data is added to a trending database under control of the administration panel of the NSF server. Also, per function 290, NSF Trending database records all gift purchase data matched with recipient's demographics. Further, NSF "group present"—allows an inviter to choose a gift (with feedback from a group of friends and family through messaging) with messaging leading to group member identification. Also, NSF "Personal Registry" allows a user to create personal gift, event and/or social engagement registries for events (e.g. wedding, baby) with specific interests and requested products or services tailored to that particular event. The user's contacts may receive recommendations and can choose to buy a gift, event and/or social engagement from the personal registry. Once a gift, event and/or social engagement product or service is purchased, the item is entered into a gift, event and/or social engagement depository for, for example, input to a trending database and related trending algorithm at the NSF administration panel server, and gifts in a gift depository or a "dislike list" for a given user profile are excluded from recommendation lists. The Gift depository and trending databases store information on the trending database under control of the administration panel of the NSF cloud server. Purchasing affiliate links with products specifically tailored to the personal registry based on individualized keywords entered by the user for the event are provided to the user's contacts. For example, an NSF user may create a personal gift, event and/or social engagement registry for a housewarming party and specify that she needs certain items, for example, a blender, a television, bed sheets, and other household items that she needs. All invitees to the housewarming party may be provided with the housewarming gift, event and/or social engagement registry who are members of NSF. This allows purchasing affiliate gift, event and/or social engagement recommendations to be customized based on items requested by the user instead of or in addition to general housewarming gift, event and/or social engagement recommendations that are trending for a person with the same demographics and personal interests as the user.

Referring again to FIG. 2A, recommendations per function 260 passed to function 240 may also include, for example, tickets to concerts, festivals, performances, or other events based on the recipient's personal gift, event and/or social engagement registry or stated interests, likes and dislikes. For example, a user may input a list of favorite bands (musicians) among her interests, and her personal NSF social network may receive a notification, gift, event and/or social engagement recommendation and purchase link when concert tickets become available for those bands if the selected members share the same interest in the band. The user herself may receive a reminder when her favorite bands are in town along with a link to purchase tickets and an option to invite others in her network to attend. See, for example, push or e-mail notification function 240. The user's contacts may receive a recommendation to purchase tickets to those concerts as a gift, event and/or social engagement for the user. In another example, a user may list wine among his interests, and a wine tasting event is scheduled to take place within a few days of his birthday. That user's friends may receive gift, event and/or social engagement recommendations for his birthday that include tickets to this wine tasting event and a link to an affiliate site where tickets may be purchased; (see function 250 which may be administered by the administration panel NSF administration panel server). The member of the user's NSF personal social network may have expressed a similar interest in wine identified at function 230.

In a further embodiment, referring again to FIG. 2B, users may coordinate the purchase of a group gift, event and/or social engagement for the recipient by selecting a gift, event and/or social engagement (for example, exceeding a cost within one's personal budget) and inviting other contacts through NSF to share the cost through a special gift, event and/or social engagement registry invitation. For example, the group purchase feature as shown in Not So Forgetful Gift Registry, Gift Depository and Trending Database function 290 may be used to buy a larger or more expensive gift, event and/or social engagement such as a vehicle, a lease, or a down payment on real property. A group purchase may be initiated by one user who suggests the gift, event and/or social engagement in a group message and invites others in the recipient's social network to participate. A recommended contribution for each participant may be provided as a guideline, and users may contribute a selected amount of money toward the gift, event and/or social engagement. A group purchase may be paid by a commitment to the group purchase through a credit card, debit card, or a payment service such as PayPal, Apple Pay, Google Wallet, etc. The user initiating a group purchase may set a deadline by which all funds for the purchase are received. If a sufficient amount of money is committed by the group before the deadline, the group gift, event and/or social engagement is automatically purchased for the recipient with the sum of user payments, and other users are precluded from contributing to the group purchase. If there is insufficient funding for a group gift, event and/or social engagement before the deadline, users who committed to the purchase will not be charged or may be invited to contribute an additional share (if the time for making a group purchase has not expired). Throughout the group purchase process of function 290, participating users are notified whenever someone commits a payment to the purchase and also notified when the gift, event and/or social engagement is purchased (so that they may choose other means for obtaining a gift, event and/or social engagement in time for a given event). Alternatively, the costs of the gift, event and/or social engagement may be automatically split between members via a credit payment application, with each member receiving reminders with ways to input their proportional payments calculated by either a donation or in proportion to the group size for a certain amount under the constraint of a set time frame. At the end of the time frame, the group has the option to increase each participant's payment if some members do not pay, and/or request that other members pay their portion.

Continuing the discussion of FIG. 2A and FIG. 2B, after function 260, the NSF application may communicate by push or e-mail or other known communication via Push or E-mail Notification function 240 to provide reminders for events and obtain pictures, prices and pick-up or delivery information for a recommended gift, event and/or social engagement generated by the trending database (function 290 of FIG. 2B) or via a continuously updated gift, event and/or social engagement registry. Once a gift, event and/or social engagement is purchased, the gift and/or social engagement is added to a gift, event and/or social engagement depository for the demographic and is eliminated from the gift, event and/or social engagement registry.

Function 270 of FIG. 2A is shown as an outgrowth of function 250 which is described as links to purchasing affiliate websites or function 250 where recommended gift, event and/or social engagements may be purchased. Function 250 is not intended to eliminate brick-and-mortar store purchase which may be facilitated by use of near field communication of a smart client communication device of an NSF member with a store transaction terminal. Function 270 is intended to first provide purchasing assistance, for example, for purchasing a one-of-a-kind gift, event and/or social engagement only available through a particular brick-and-mortar store such as an antique shop or particular web site such as eBay. While purchasing assistance is normally provided by a web site, a near field communication system such as Apple-Pay or Google-Pay may assist with a brick-and-mortar store purchase to be sure that the correct sales tax is applied at the store location. Moreover, the near field communication system for a brick-and-mortar store purchase may output that a purchase has been made via NSF thus confirming the purchase and lead to the gift, event and/or social engagement's removal from a gift, event and/or social engagement registry and entry on a gift, event and/or social engagement depository database (function 290).

FIG. 2C provides an overview flowchart for NSF gift, event and/or social engagement registry, gift depository, and development of a trending database. Function 215 relates to a baseline gift, event and/or social engagement/event search list. An item on a gift, event and/or social engagement registry may be out-of-the-ordinary and so require special search. A baseline list of gift, event and/or social engagement search keywords from what is known about the gift, event and/or social engagement and the search for the gift, event and/or social engagement may be controlled from the NSF cloud-based administration panel server having searching algorithms communicating with search engines which may be able to identify a particular purchasing source via an internet source using, for example, some of the categories of products and services offered on eBay (NSF user input or automatically generated based on interests, likes and dislikes data received into a personal smart NSF client device from the user). If no likes, hobbies or demographics are stored in an NSF database for an NSF member that may be applicable for a given event, only baseline search terms may be used for the NSF member for developing a gift, event and/or social engagement search or recommendation. For example, NSF may resort to universally desirable suggestions such as gift, event and/or social engagements of money or gift, event and/or social engagement cards at department stores as a suggested gift, event and/or social engagement. Function 215 may lead to function 225 for top ten trending. What could a person of a given demographic want, for example, given age and sex and relationship to the user as demographics? Top ten gift, event and/or social engagement selections may be based upon search terms associated with likes, interests, events, gender, location, religion, relationship and other demographic data. Although not shown, biometric and physical health data may also be used as a filter for selecting certain gift, event and/or social engagements. Furthermore, top trending for recipient profiles may be based on search terms and searches for gift, event and/or social engagements that have not already been purchased and so items in a gift, event and/or social engagement depository excluded. Finally, according to function 225, external API's may be used to provide gift, event and/or social engagement trending input such as purchases already made by the user at Amazon that are frequently needed or acceptable such as a bottle of the recipient's favorite perfume or a dozen of the recipient's favorite flowers.

Top Ten Trending function 225 may lead to recommendations 235 function where recommendations are sent to a user with (without) links to purchase gift, event and/or social engagements which may include brick and mortar stores or eBay lot numbers where unique gift, event and/or social engagements may be obtained.

Top Ten trending function 225 may receive inputs from function gift, event and/or social engagement/present selection function 245 and from a gift, event and/or social engagement registry/gift depository function 255. The gift, event and/or social engagement/present selection function is a search engine based, for example, on event/demographic/gender/religion/location-based searches and an output of recommended gift event and/or social engagements may be provided to top trending function 225. Top 10 Trending may be developed from search terms associated with likes, interests, events, gender, location, religion and other demographics. Top 10 trending for a recipient profile may be based on searches and gifts purchased. Furthermore, the gift, event and/or social engagement/present selection function 245 may learn from external API's and internal NSF data of NSF users who are, for example, demographically similar to the recipient.

A further input to a top ten trending function 225 of FIG. 2C is what is being entered in a gift, event and/or social engagement registry today at gift registry function 255 (until a gift, event and/or social engagement registry may expire). Gift Registry function 255 comprises selection of gifts for a specific person, and gifts already purchased are excluded from recommendations for that user and added to the NSF database. A gift, event and/or social engagement registry function 255 may comprise a selection of gift, event and/or social engagements for a specific person and associated with a specific event. Gift, event and/or social engagements already purchased for the proposed recipient and identified in a gift, event and/or social engagement depository may be excluded from recommendations for a particular user and added to the gift, event and/or social engagement depository database as well as used, for a limited time, in developing a trending database. For example, gift, event and/or social engagement data of gift, event and/or social engagement registries of a collection of thirteen-year-old teenaged women may be used to develop a top ten list of gift, event and/or social engagements for such teenagers.

FIG. 3 provides three examples of automatically generated gift and/or social engagement searches and resulting purchasing affiliate links; (brick and mortar store purchases are not shown). In one example, an NSF user is reminded to buy a gift and/or social engagement for his wife for their twenty-fifth wedding anniversary. The twenty-fifth wedding anniversary is known as a silver anniversary and other such special gift and/or social engagement selections may be stored for possible selection for other specific anniversaries. She is a member of the NSF social network and information stored on the database includes her age (57), location (New York), religion (Christian), and relevant interests (gold, jewelry, travel, and Hawaii). Her GPS based intelligent device may record her travel and influence a choice of a gift or social engagement recommended for her. Based on her demographics, her interests, and the nature of the event, the present invention may generate the following keywords for a gift and/or social engagement search: silver, gold, necklace, bracelet, Hawaii, vacation, wife, $25^{th}$ anniversary. This search would provide the user with several gift and/or social engagement recommendations and links to purchase gift and/or social engagements. In this example, affiliate links include a jewelry vendor and an affiliate travel site.

In a second example, the user is reminded to buy a gift and/or social engagement for his newborn nephew for the child's baptism. The child may not have a profile on the social network entered by a parent and no interests or hobbies are available. The user may manually enter known information on the child's gender and religion to generate a search with keywords relating to, for example, a boy's baptism. Gift and/or social engagement recommendations in this example include a prayer plaque, cross, and baptism frame available from Amazon.

In a third example, the user is reminded to a buy a gift and/or social engagement for a college graduation of a twenty-two year old female who lives in Los Angeles. Her favorite color is red and her interests include fashion and environment causes. Gift and/or social engagement recommendations for this person include red hybrid cars. Because a car is an expensive item, users in the recipient's social network may wish to use the already explained group purchase feature for this gift and/or social engagement to split to cost. Fashion is personal to a user and environmental causes may be the same so it may be appropriate to default to a gift and/or social engagement of money.

In one embodiment of a personal reminder and gift and/or social engagement selection system according to the present invention, users of the system, also referred to herein as account holders, may automatically search the system and related databases to locate gift and/or social engagement recommendations for a member of the account holder's personal network with an upcoming event that is stored in the system. Alternatively, an account holder may initiate a search by manually inputting event data and demographic data for the gift and/or social engagement recipient. As a result of the search, the system may provide information about a product or service offered by an affiliate or other entity and may automatically request an alert or receive a pushed alert from an affiliate or other entity about a desired product or service.

Figure 4:
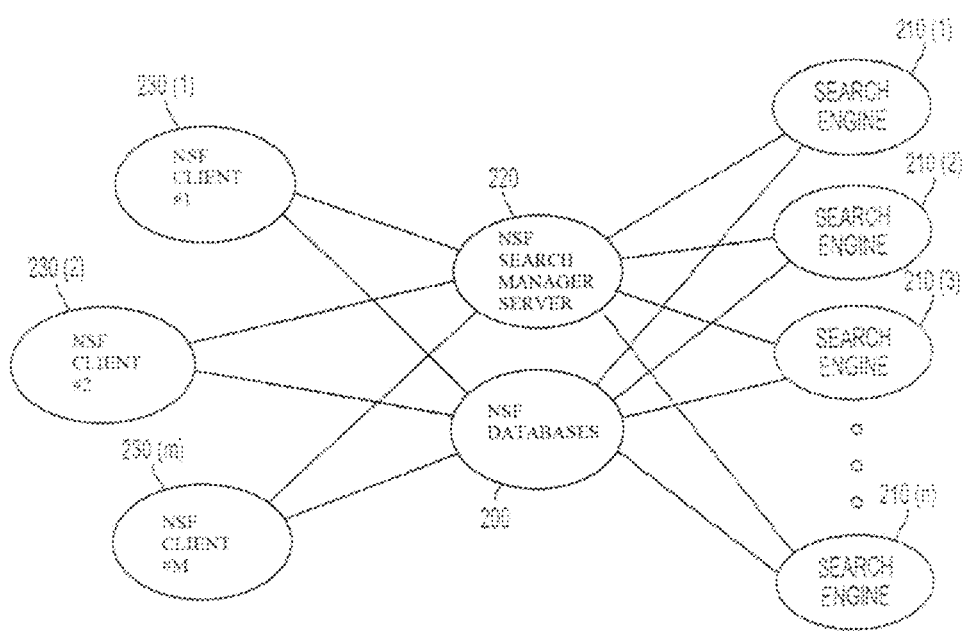
FIG. 4 is a graphical overview of the architectural components of an NSF client-NSF server local application and administration panel and collection of databases supporting indexing, search and retrieval according to one embodiment using multiple search engines, servers and databases at the respective servers such as links to purchasing affiliate product and service data.

Referring now to FIG. 4, FIG. 4 provides a graphical overview of the primary architectural components of client-server databases and search engines supporting similarity-based based indexing, search and retrieval by gathering trend data as discussed above and product/service information from multiple purchasing affiliate services (Amazon, Ebay, Groupon, for example) which are searched using search engines 210 such as search engines available at these internet URL's and, for example, sql database and other database queries. Client devices personal to NSF users must be running NSF client applications and are identified as client devices 230(1), 230(2) and 230(n) for all members of NSF. These client devices 230 are personal to NSF members. For example, NSF device 230(1) may or may not be a member of the NSF social network of device 230(2). On the other hand, much demographic, like, dislike, interest, event, location and religion data are transmitted to NSF administration panel search manager server 220 and related gift and/or social engagement registry, gift and/or social engagement depository and trending databases 200 for use, for example, in learning and periodically developing current gift and/or social engagement trends and communicating with search engines 210 of purchasing affiliates such as Amazon and eBay 210(1), 210(2), 210(3) as well as API's (not shown) and outside NSF vendors 210(n) for locating gift and/or social engagements and developing gift and/or social engagement recommendations. Purchasing affiliate Amazon may recommend to a particular NSF client that they buy what they have purchased before such as household bulk items (for example, toilet paper and hair coloring kits) which NSF should exclude as a possible gift and/or social engagement recommendation. On the other hand, special scented bars of soap such as lavender soap, if recommended by Amazon, may be recommended as a gift and/or social engagement. Moreover, the purchasing affiliate may provide coupons or special offers to the NSF user as an inducement to purchase a product, service or social engagement.

Referring further to FIG. 4, a client 230(1), 230(2) to 230(m) may be a laptop, intelligent mobile device, such as a smart phone, pad, watch, glasses, or other personal intelligent device equipped with such features as vehicle or smart home integration, for example, with near field communication to a transaction terminal, global positioning system, touchscreen selection, keyboard entry and be connectable by WiFi or wireless telecommunications link to the NSF search manager 220 and database servers 200 which may be cloud-based servers of the NSF system or to search engines 210 of purchasing affiliates or third party entities via search engines 210(1) through 210(n). As discussed above, Amazon may be a purchasing affiliate search engine which may provide gift and/or social engagement selections such as mystery books as a gift and/or social engagement for an NSF member having a like or an interest in mystery novels. FIG. 4 is simplified from what may comprise an NSF network and so may involve hundreds of different client device NSF member devices, NSF servers and databases and search engines such as public sources of data such as birthday, wedding and graduation event data as suggested above.

A client 230 may be any intelligent device capable of sending and/or receiving data through the administration panel servers/search managers 220 or databases 200 (gift and/or social engagement registry, gift and/or social engagement depository, trending databases) and interacting with a user using the NSF client application which may be downloaded from the central NSF server 220 to a new member of NSF upon sign-up. For example, an NSF client 230 may be a smart television, a "smart vehicle" with a computer, or even a tablet device integrated with the vehicle, a "smart house" with settings such as temperature, light, door locks, etc. that are connected to a communications network (such as the internet, telecommunications messaging or other suitable networks and may be controlled through an app or another device. In one embodiment, the present invention may be installed as an application on a mart television and provide video reminders through the television screen. Some smart televisions are equipped with voice recognition, so a user may communicate with the television by voice command, remote control, or other communication device. An individual using the memory assistance functionality of the present invention as described in FIGS. 7A, 7B, and 7C may, for example, view videos and personal reminders on the large screen of the television or the small screen of a mobile communications client device 230.

In another embodiment, the invention may be used in conjunction with a smart vehicle to provide reminders and local recommendations for gift and/or social engagement shopping, for example, at brick and mortar stores such as Bloomingdale's which may be a purchasing affiliate member of NSF and nearby events, performances, shows or attractions that may be of interest to a person in the user's NSF social network. Local recommendations may be based on the GPS location of the vehicle or client device 230, for example. If the user consents to share the vehicle's location, and may be provided through the vehicle's built-in computer. For example, a user whose mother's birthday is the following month may be on schedule to receive an event reminder with gift and/or social engagement recommendations. The user's mother has entered gardening among her interests. As the user drives by an affiliate home and garden store, the smart vehicle's interface may show a birthday reminder and a recommendation to purchase a gift and/or social engagement at the local garden store. Furthermore, the store may make special offers to the user or offer coupons for gift/social engagement recommendations. In another example, the present invention may provide timely event or appointment reminders on the vehicle's display screen and provide the user with an option to automatically begin GPS navigation to the event or appointment.

In a further embodiment, the present invention may be integrated with a smart home system. For example, the memory assistance function of the present invention may remind (perhaps a more heavy reminder) an NSF user who is leaving their home to lock the door, activate a security system, or turn off lights, air conditioning, heat, stove, or other appliances. In this embodiment, network-connected appliances within the smart home may be set to share their status with the NSF database of the client device 230 of the present NSF invention and provide notifications and reminders to the user. For example, if the smart home system senses that a stove has been on for too long or a door remains unlocked past a certain hour, a user may receive an NSF notification or reminder on their client device 230. The user may be provided with an option to remotely adjust settings in the home through an application running on the user's intelligent NSF application equipped mobile device 230, which may be a smartphone, tablet, smart glasses, vehicle, or other network-connected device. For users with severe memory impairment, the invention may provide an automatic emergency alert option coupled to sensors in a smart home, for example, to automatically call an emergency contact or provider if a sensor detects a fire or the existence of carbon monoxide in the air. An accelerometer or gyroscope of an NSF memory assistance application programmed intelligent device 230 worn by the user may detect a fall by the user and transmit an emergency alert to medical personnel.

One application of a heavy reminder may operate as follows. A mentally deficient user of the application may not recognize an individual that comes to visit. The user may take their picture, the picture may be uploaded to the NSF server, the server may provide recognition software to identify the visitor, may locate in memory the visitor's name and relationship to the user and the user's client device may receive from the NSF server an early photograph of the visitor and the user as well as the visitor's name, relationship to the user and a brief history of the visitor such as: this is your sister, Joan, who has two children, Jane and John and her husband's name is Joe Smith.

Referring further to FIG. 4, the NSF search manager 220 may comprise a program which may likewise run on the client device 230 that searches purchasing affiliate services for gift and/or social engagement or event data. And search engines 210 may locate products and services based on an NSF gift and/or social engagement recommendation or trending database algorithm. The database (or preferably a collection of databases) 200 utilizes a local client-cloud server architecture that provides simultaneous services to multiple clients, the NSF social networks of client devices and offers NSF membership to multiple users (such as a household of users) by invitation or by automated recommendation of those client devices of NSF account holders of the NSF system. The client device 210 may, with an NSF account holder's permission, automatically upload information such as such as geolocational data, language, calendar entries, smart device contacts, and e-mail contacts (e.g. from Gmail, Hotmail, AOL, etc.) from the client device 230 onto a demographics or NSF membership database of the databases 200. In a preferred embodiment, the databases 200 may be associated with cloud search manager NSF server 220 or search engine 210, such as, for example, one provided by Amazon Web Services for storing user and prior purchase data. The NSF client device 230 may also be used to input and store user data such as interests, dislikes, events, hobbies, religion, and demographic data and then share/upload such data with NSF server 220 (or vice versa, a new religion to NSF may be downloaded to client devices 230 to be added to a drop-down menu).

In addition, memories can be stored either at the personal NSF device 230 such as pictures, audio and video recordings from the device with permission. With the user's permission, this data may be uploaded onto the NSF database 200 for sharing with family and friends. Architectures have been implemented that leverage the advantages of parallel computation, using both clusters of computer nodes and single nodes with multiple processors and cores. Such an architecture may be useful to differentiate a search manager and search engines in Germany from those located in the US such that when an NSF member is visiting one or the other country, appropriate search managers are used local to the country (as appropriate, for example, Web.de in Germany or eBay.CA in Canada). A commercial off-the-shelf database 200 or a computer or network file system (referred to herein generally as an "NSF Database") can be utilized for persistent storage of user data, with user permission, while the high-performance in-memory indexing and search technologies are implemented in Search Engines 210(1) to 210(n) that operate as cooperating threads or tasks within the overall architecture (for example, searching for data for a given gift and/or social engagement (product or service), event (wedding or funeral), product provider or service provider data from one or more cloud-based servers supporting the client device 230 networks). A Search Manager 220 provides coordination between the Clients 230(1) to 230(n), an NSF Database 200, and Search Engines 210(1) to 210(n), as well as the initial connection protocol for the clients 230(1) to 230(m) to join NSF and enter membership data such as event, interests, likes and dislikes. The client device NSF application can be parallelized by allocating separate computational resources to each component, such as a Search Engine 210(1) to 210(n), by allocating multiple computational resources to any component, as occurs in a Search Engine 210 that utilizes multiple threads, or using a combination of these methods to arrive, for example, at gift and/or social engagement recommendations for device NSF member 230(1) as opposed to device 230(2).

Communications among server/device/database/search engine components in a parallel implementation may be effected using a communications medium such as a computer network or using shared memory. The NFC (near field) communication is short distance between tag or transaction terminal at a location of a product or service purchase and NFC client 230 but an intelligent telephone or mobile device client 230 may communicate with a NSF database 200 and search manager 220 that are cloud-based and distant or remote from the NSF client 230 such that databases 200 and NSF search manager 220 in turn may refer to a search engine 210(1) to 210(n) to collect data applicable to a particular product or service, for example, a purchasing affiliate link that has been book-marked as a favorite product or service provider or other product or service provider by the user of NSF member device 230. Search engine 210 may also refer as described above to links to web sites of publicly available data, for example birth records, for marriage records, for graduation event details, for wedding event details and the like to supplement or obtain data not entered via an NSF client 230.

In another embodiment, the invention is directed toward one or more computer systems such as mobile devices, tablets, smart glasses, smart watches or arm bands monitoring medical data such as blood pressure, temperature and pulse, smart televisions, smart vehicles, or smart homes capable of carrying out the functionality described herein having associated memory and databases. Also, many such devices as mobile phones and personal computers or tablets or servers may have a similar well known architecture.

Figure 5:
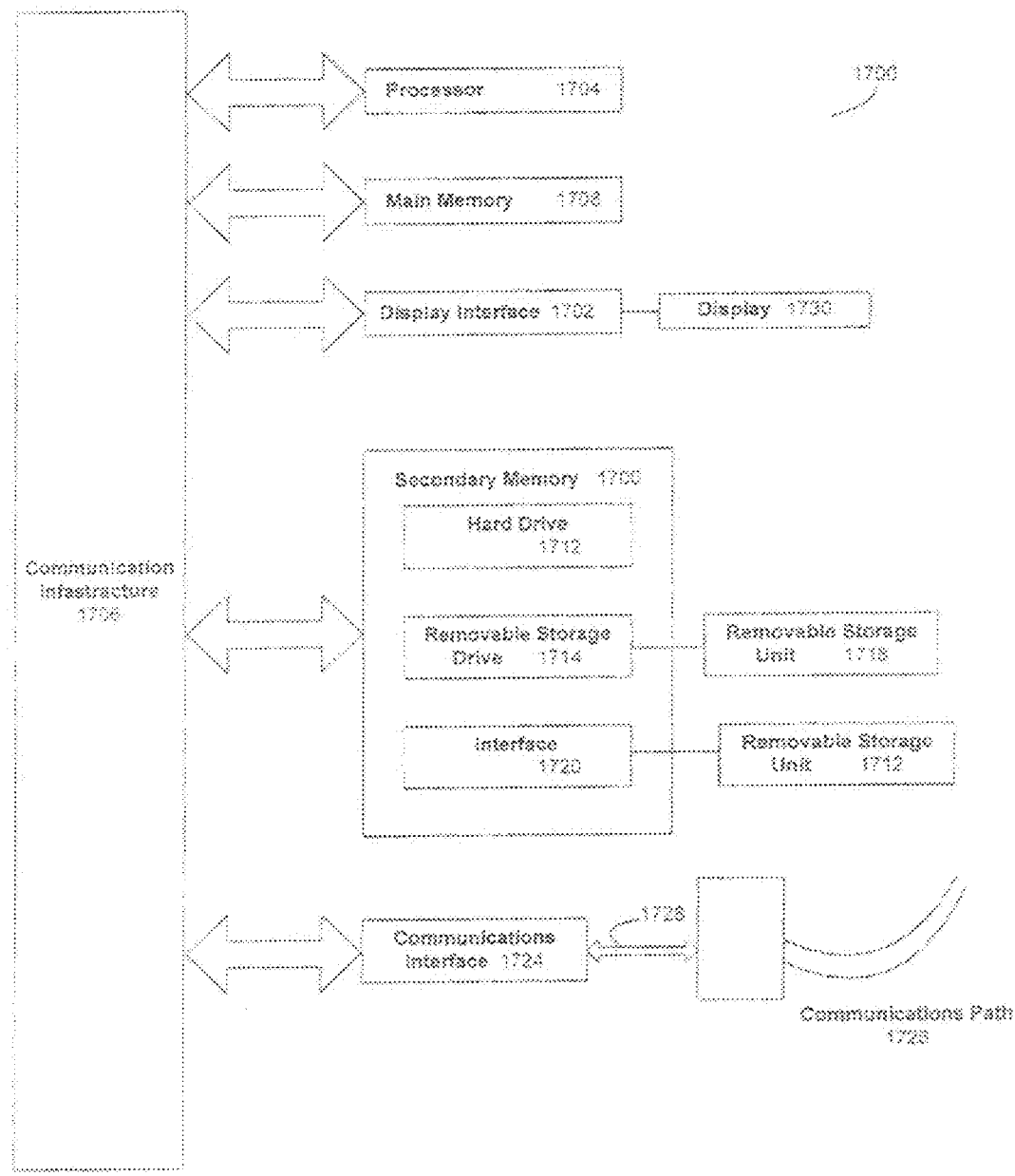
FIG. 5 is a block schematic diagram showing an example of the computer system of one of a sophisticated mobile client device running an NSF client trending and/or memory assistance algorithm application and a cloud-based administration panel server running a different trending algorithm and/or memory assistance algorithm in communication with search engines 210 for storage in a main memory and having a secondary memory for storing local data and retrieving personal data as necessary such as biometrics data, personal data and location data and the mobile client device may include a near field communication device for communication with brick-and-mortar store transaction terminals for making purchases.

An example of a computer system 1700 of a sophisticated intelligent (or so-called smart) mobile device 230 (FIG. 4) or NSF server/databases system 220 is shown in FIG. 5. The depicted NSF hardware example does not show all aspects of a smart device or a computer server that may or may not be present such as a camera, microphone, speaker, display, a clock, a time of day and date calendar (for example, one selected by a user as personal to them), a GPS unit, an accelerometer, a gyroscope, a touch screen, a keyboard and other features of a typical mobile device 1700, 230 or NSF search manager 220. If GPS is not available to locate an intelligent client radio frequency triangulation may be used as an alternative to locate a user's device. However, such features of an ever improving digital camera or a mapping service are typically found in mobile devices known in the art and now even comprise video cameras for capturing sequences of images if selected by a user. Similarly, servers are typically provided in parallel such that an NSF server/search manager 220 in the United States may periodically synchronize to data of such a search manager in Germany or other location within the United States. One reason is that an NSF server that may be destroyed by earthquake in California may be backed up by data stored on an NSF server/database collection 220, 230 by one not in an earthquake zone.

Referring now to FIG. 4, computer system/server/mobile device 1700 typically includes one or more processors, such as processor 1704, for program control by an NSF program which is referred to herein as an administration panel comprising a plurality of special purpose algorithms such as developing trending data for a trending database based on demographics, searching for supplemental information to event data input by an NSF member, a database of purchasing affiliates, a gift and/or social engagement registry database, an NSF member database comprising likes, dislikes, interests, hobbies, age, address, gender and other demographics of the NSF member and other databases which may be relational databases or other forms of databases so that data in one database may be used to obtain different data in another database such as matching a gift and/or social engagement registry selection of gift and/or social engagements to purchasing affiliates which provide such goods and services. The processor 1704 is programmed as a special purpose processor to input user data including but not limited to demographics, interests, likes and dislikes, important dates and event, specific locations (for example, via GPS), audio and video information and contacts and calendar data store such information about an NSF user and events, the NSF user's personal social network of friends, purchasing affiliate data, and links to public source data about events and a friend and family social network for a particular NSF user as well as the user's larger list of contacts on an NSF cloud server/search manager 220 and database 200, to, for example, automatically search purchasing affiliate services via search engines 210 and API links for products or services that are recommended as gift and/or social engagements for a user's personal contacts (their social network) based on the contacts' demographics and interests along with third-party data available from the purchasing affiliate services, further refine the search results based on gift and/or social engagement registry data that was input through the system, eliminate user dislikes, delete dated gift and/or social engagement depository data from trending and automatically display results on the system's display 1730 such as the top ten most popular gift and/or social engagements for young sixteen year old women. The processor 1704 is connected to a communication infrastructure 1706 (e.g., a communications bus or network of any kind, for example, internet or instant messaging). Various software aspects are described in terms of this exemplary computer system 1700. After reading this description, it will became apparent to a person skilled in the relevant art(s) how to implement the NSF social network invention, heavy and light memory application, event calendar and gift and/or social engagement recommendation algorithms using this and other computer systems and/or architectures known in the art for NSF client devices 230 and NSF search manager systems 220 and databases 200.

Users of mobile intelligent devices (not shown in FIG. 5 specifically) communicate with NSF computer system 1700 by means of communications interface 1706, (and vice versa) typically a device touchscreen or, with respect to a server, a keyboard and display having a reprogrammable display or other interface known in the art. A typical device 230 and NSF server 220 used by a user and by the NSF administration panel may have similar structures to NSF computer system 1700, the difference being that computer system 1700 may comprise databases 200 and larger search and memory capacity that is shared with other NSF servers 220. A mobile intelligent device 230, on the other hand, provides a user (by downloading the NSF app from the NSF server 220 and joining NSF as a user with access to any of these social networking services as well as other services such as heavy/light memory services and emergency medical services to the NSF user. The NSF user may create new images for local storage on their device 230 (for example, photographs or product scans) or doing any of the creation of the images and image portions such as representing photographs or videos of social network members or products and services of interest to the NSF account user or other members of NSF, allowing the NSF account holder to create an image of a product or service of interest to them (a favorite) and, using image recognition software, identify the item and purchasing sources for the item or event data and further data about the even or group data and further information about the group or subgroup.

Computer system 1700 can include a display interface 1702 that forwards graphics, text and other data from the communication infrastructure 1706 for display on the display unit 1730. Additionally, a computer system 1700 may display information by audio such as, for example, a system built into a vehicle providing reminders through the car's speaker system and use GPS to locate a clothing item, for example, at a department store and, moreover, guide the NSF user to drive to a department store near them whose product/service database has been scanned to determined, for example, that a certain dress is available at that store in a size 8. A display interface 1702 may comprise any data output and is not limited to a visual display such as a screen. A display, as will be described herein, may provide a touch screen for, for example, entering data. An exemplary NSF intelligent mobile device 230 app may utilize a display, such as a touch screen, that include an input device in the form of a keyboard on the screen. Other intelligent mobile devices 230 may use alternate forms of data input such as, for example, a microphone or a camera. Smart glasses, for example, (not shown) may use a camera with image or motion recognition or a microphone via voice commands to receive data.

As explained above computer system/device 1700 may have other input devices such as a keyboard, a mouse, or a microphone with voice-to-text capability. The present invention may be configured to run on a mobile device such as a smartphone or a tablet, or on a laptop or desktop computer or on a larger memory and processing capacity personal computer acting as an NSF search manager server 220. The present invention may be also configured to run on computer systems 1700 including but not limited to smart glasses such as Google glass, smart televisions, smart vehicles or computer systems built into vehicles and smart home systems. Although these systems may have different types of display and data input, all of them sharing common elements of an input, an output, a processor, memory, a collection of NSF applications which may be periodically updated as they learn and a connection to a server or database or vice versa, a connection from the database or server to the NSF app device, and the description of FIG. 5 is applicable to each type of system. As explained above, a vehicular system running the present NSF reminder application may be particularly useful with a global positioning system of the vehicle to assist a driver of the vehicle to either purchase on-line or with directions to an affiliate near-by store for purchasing a recommended item or service available at the store via a permitted search via search engine 210 of a purchasing affiliate's inventory for a gift and/or social engagement product or service recommendation of a particular size or a travel package available on a specific beginning and ending date (such as a honeymoon). A smart home system may obtain the attention of an NSF user more quickly than an intelligent device 230 running the NSF reminder application through audio or video control, for example, via a smart television in a smart home.

Computer system 1700 also includes a main memory 1708 for non-transitory storage of algorithms and a secondary memory 1710 for data input, display, and local memory, preferably random access memory (RAM) for temporary data. The secondary memory 1710 may or may not include, for example, a hard disk drive 1712 and/or a removable storage drive 1714, representing a floppy disk drive, a magnetic tape drive, an optical disk drive, etc. The removable storage drive 1714 may read from and/or write to a removable storage unit 1718 in a well known manner. Removable storage unit 1718 represents a floppy disk, magnetic tape, optical disk, micro SD card, etc. which is read by and written to by removable storage drive 1714. As will be appreciated, the removable storage unit 1718 includes a computer usable storage medium having stored therein computer software and/or data. Generally, it is important to recognize that a trending algorithm, for example, may utilize data from outside the NSF system and all such data may have predetermined expiration dates for trending based on the product or service. All this data must be stored and periodically refreshed by the NSF administration panel server 220 and data that has expired may be removed to such a removable storage device 1714 and restored if the data becomes useful to NSF again in the future.

In alternative aspects, secondary memory 1710 may include other similar devices for allowing computer programs or other code or instructions to be loaded into computer system 1700 (for example, the latest NSF app version, when updated, downloaded upon user selection from an NSF server 1700 of the system). Such memory devices may include, for example, a removable storage unit 1722 and an interface 1720. Examples of such may include a program cartridge and cartridge interface (such as that found in some video game devices), a removable memory chip (such as an erasable programmable read only memory (EPROM), or programmable read only memory (PROM)) and associated socket and other removable storage units 1722 and interfaces 1720, which allow software and data to be transferred from the removable storage unit 1722 to computer system 1700 (for example, by communication to the NSF user device 230 by the NSF administration panel once the new app version is ready for download and with the NSF user's permission with pop-ups provided that a new app version and features is available tor download.

Computer system 1700 also includes a communications interface 1724 which may be a cellular radio transceiver known in the cellular arts and/or through radio frequency communications such as Bluetooth or IEEE 802 (e.g. WiFi). Mobile and RF communications interface 1724 allows software and data to be transferred between computer system 1700 (either mobile device 230 or NSF server 220 and external devices or services (such as non-affiliate links and public data sources) and may comprise access to telecommunications, testing, the internet, external servers or data storage, other social networks (such as Facebook or LinkedIn) including an NSF personal social network provided by the present invention. The communications interface 1724 allows a computer system 1700 to upload data to the present invention's databases 200 located one or a parallel synched collection of cloud servers 220 and one server receive updated data from another server 220. Examples of communications interface 1724 may include a modem, a network interface (such as an Ethernet card), an RF communications port, a Personal Computer Memory Card International Association (PCMCIA) slot and card, a WiFi network, a cellular/mobile network such as 4G, etc. Software and data transferred via communications interface 1724 are in the form of non-transitory signals 1728 which may be electronic, electromagnetic, optical or other signals capable of being received by communications interface 1724. These signals 1728 are provided to communications interface 1724 via a telecommunications path (e.g., a communications channel) 1726. This channel 1726 may carry data signals and commands (for example, an updated NSF app) 1728 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 1714, a hard disk installed in a hard disk drive 1712, for example, used at an NSF administration panel server 220 and signals and commands 1728. Not all intelligent mobile devices 230 have all these features. These computer program products provide new NSF administration panel software to computer system 1700 or use already programed software of NSF panel 220 to learn from NSF user entries and the like about new events, newly available gift and/or social engagements of products and services and different sources and related data about the sources and their requirements. The invention is, in part, directed to computer authentication methods and apparatus to assure that each NSF device 230 and each administration panel server 220 is running the most up to date algorithms for event calendaring, gift and/or social engagement trending and the like.

Computer programs (also referred to as computer control logic for NSF) are typically stored in main memory 1708 and/or secondary memory 1710 of a device 230 or server 220. Computer programs may also be received via communications interface 1724. Such computer programs, when executed, enable the computer system 1700 to perform the specific purpose features of the present invention, as discussed herein. In particular, the gift and/or social engagement recommendation and memory assistance computer programs of the present invention, when executed, enable the processor 1704 to perform the features of the present invention and provide access to further features that are virtually unlimited (but importantly, personal to an NSF user individual account holder and should not be accessed by others without permission from the user or permission of an invited friend or family member). One example is a parent entering NSF data and opening an account for an under-aged child or newborn.

In an embodiment where the invention is implemented using software, the software may be stored in a computer program product and downloaded into computer system 1700 (device 230) or developed for NSF server 220 using removable storage drive 1714, hard drive 1712 or communications interface 1724. The control logic (software), when executed by the processor 1704, causes the processor 1704 to perform the functions of the invention as described herein for a given NSF device 230 or server 220. The present authentication method and apparatus may be downloadable to a mobile device 230 from an applications store (for example, from Google or Apple) rather than from an NSF site and so Google and Apple, for example, must be synched to the same software as is scheduled to run on any NSF app device 230.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). On the other hand, every effort should be used to assure that the hardware is capable of performing commands of a new NSF application or new administration panel version.

As will be apparent to one skilled in the relevant art(s) after reading the description herein, the computer architecture shown in FIG. 5 may be configured as any number of computing devices such as a system manager, a work station, a game console, a portable media player, a desktop, a laptop, a server, a tablet computer, a PDA, a mobile computer, a smart telephone, a mobile telephone, an intelligent communications device or the like.

Figure 7A:
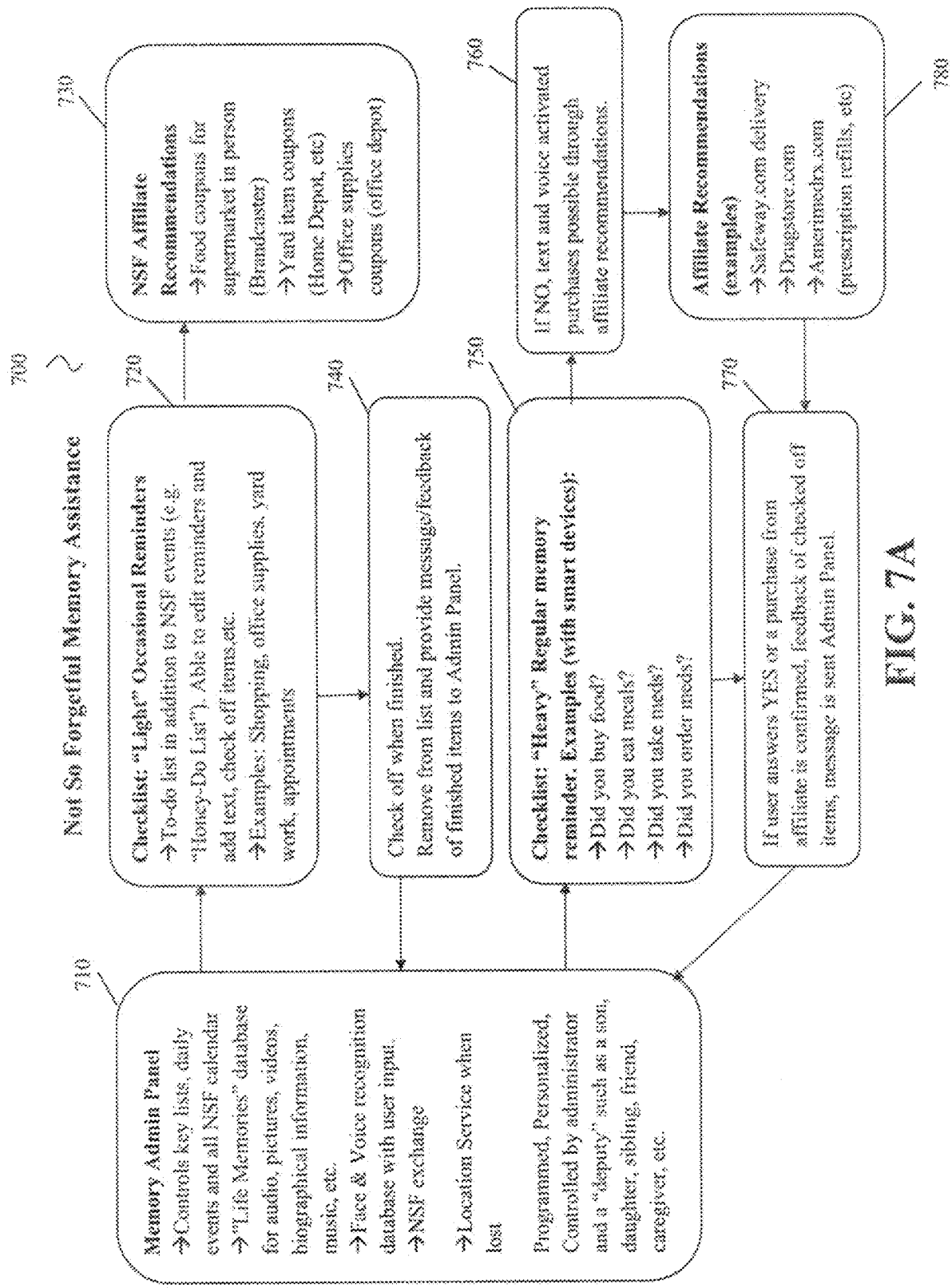
FIGS. 7A, 7B, and 7C are flowcharts depicting the memory the memory assistance functions of the present invention implemented on an NSF client device.

Referring to the flowchart of FIG. 7A, the present invention may include a memory assistance function or application for use by an individual with memory issues such as individuals diagnosed with senility, dementia, Alzheimer's or brain damage that provides light and heavy memory reminders and related recommendations with affiliate purchase links to users with memory issues or impairment. Light reminders, as already described, may be a regularly scheduled to-do list for reminders of chores and errands, for example, a "Honey-Do" checklist for things to do such as shopping, dry cleaning, etc. provided via the administrative panel 220 or entered by the user as a self-reminder at device 230. The checklists also may provide or remind of purchasing affiliate recommendations such as, for example, a local grocery store normally used for grocery shopping providing food coupons for an item on a grocery list and so a grocery shopping reminder to buy that item at that store or, for example, home supply store coupons for a yard work reminder.

As described briefly above, those with more severe memory issues and requiring memory assistance could be reminded with "heavy" recommendations of vital daily tasks. For example, "heavy" reminders could include repeated daily tasks such as taking medications, eating meals, or shopping for food or household supplies given with recommendations from affiliate sites. Shopping reminders may be linked to recommendations of purchasing affiliates or favorite sources (flower shops) for online vendors, coupons, and special offers. When an item on a light reminder or heavy reminder checklist is completed, the user may view a displayed list of items and indicate that the list item has been completed. This will remove the item from the list in secondary memory of the smart mobile client device and send feedback to the administrator. The NSF administration panel server or memory assistance administrator may solve the known problem of obtaining the highest priority item first such as Who am I? or Where am I? responsive to voice recognition of a mentally challenged owner of a smart client mobile communication device of the personal social network. The memory assistance administrator or NSF cloud-based administration panel server may be a person designated by the user in need of memory assistance such as a son, daughter, spouse, relative, friend, caregiver, etc. while the server is a specially programmed server with main memory for non-transitory storage of trending and memory assistance algorithms.

For example, for light reminders, there is a list for things to do which may vary from week to week (such as a "Honey-Do" checklist for shopping, dry cleaning, etc.) provided by administrator panel 220 (for example, generated from prior lists of "to do's" on a weekend and editable also by the user. The checklists also provide recommendations for items to be purchased online or in-person through affiliate account links or smart device coupons.

After items are purchased (for instance online or in-person) or completed from the checklist, when they are checked off, this information goes back to the administrator panel 220 and are entered into the gift and/or social engagement depository with an expiration data and a notification can be given, based on settings, that the gift and/or social engagement has been purchased to a permitted NSF member such as a notification to a mother of a bride that a bridal gift and/or social engagement has been purchased and should arrive by a given date.

For those with heavy memory issues, for example, repeated daily tasks such as taking medications, eating meals, or shopping for food or household supplies could be reminded with recommendations given with suggested purchasing affiliate sites. Features front smart devices such as tapping from the iWatch could be programmed into the reminder for specific items like food or medicine reminders. Shopping reminders may be linked to recommendations for online vendors, coupons, and special offers.

The invention may provide NSF personal and family reminders of another user's personal network, for example, for group purchasing of tickets for an event in the future. NSF may provide a general information display of user-selected life memories from stored JPEG images or from videos or audios stored on the NSF user's personal device 230, and assist the user with recognizing photographs of important people and use the user's own photograph to remind the NSF user of what they looked like when.

Figure 6:
FIG. 6 shows three sample screen displays of the NSF client software invention implemented on an intelligent mobile phone depicting event reminders, gift and/or social engagement recommendations, and social networking functions.

Referring to FIG. 6, there is shown a succession of NSF screen shots that may be displayed on an NSF device having an NSF application already downloaded by contact with an NSF server 220. A HOME page is shown at left which may display, for example, upcoming events of interest—for example, Carol's birthday on March 12. A recent events feature provides a list, for example, of events that have occurred for a member of one's personal NSF social network, for example, Brad's concert event occurred on February 25 and may be linked to photographs taken at the event of the group that attended Brad's concert event.

The center screen shows an example of a screen of a device 230 providing a birthday gift and/or social engagement recommendation for a male—in particular, Carol's 4 year old son's birthday of a Tickle Me Elmo as well as other gift and/or social engagements (not shown, but which may be scrolled though) to the left and to the right. One may bookmark and search for the displayed gift and/or social engagement or view and obtain/purchase the gift and/or social engagement by pushing the depicted buttons from a purchasing affiliate. The screen to the right shows a personal network screen, for example, showing important people—family may include Donald Wilson and friends may contain Janet or Brad. The e-mail button allows for sending a personal message and there may be an entire drop-down menu of how and for what purpose one member of NSF may communicate with a family member or friend—invite to an event, suggest a group purchase for a common event such as a wedding or graduation or determine what remains on a gift and/or social engagement registry prepared, for example, for Carol's birthday identifying suggestions for purchases or results of a trending algorithm for Carol's demographic and interests data.

Figure 7B:
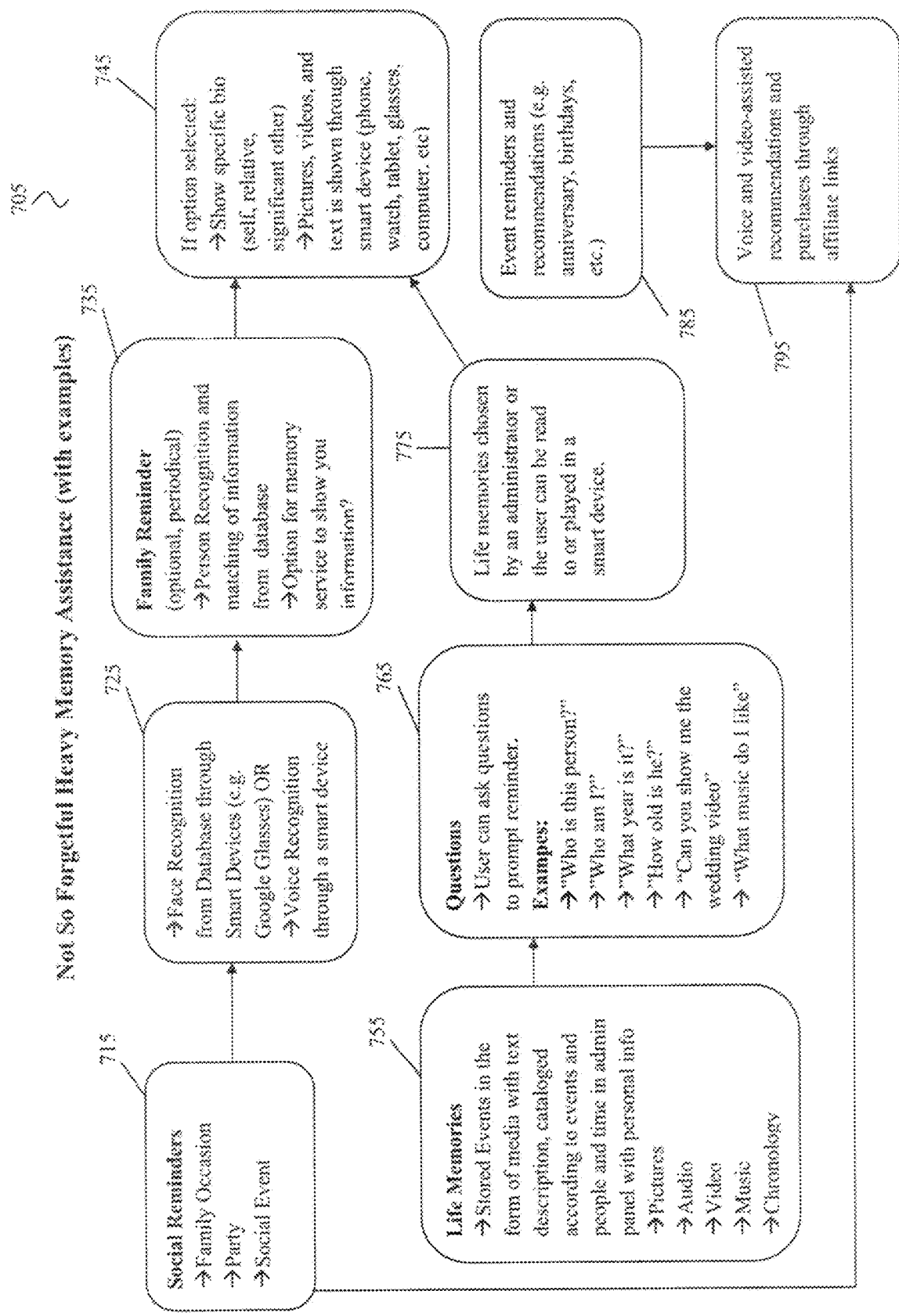
Figure 7C:
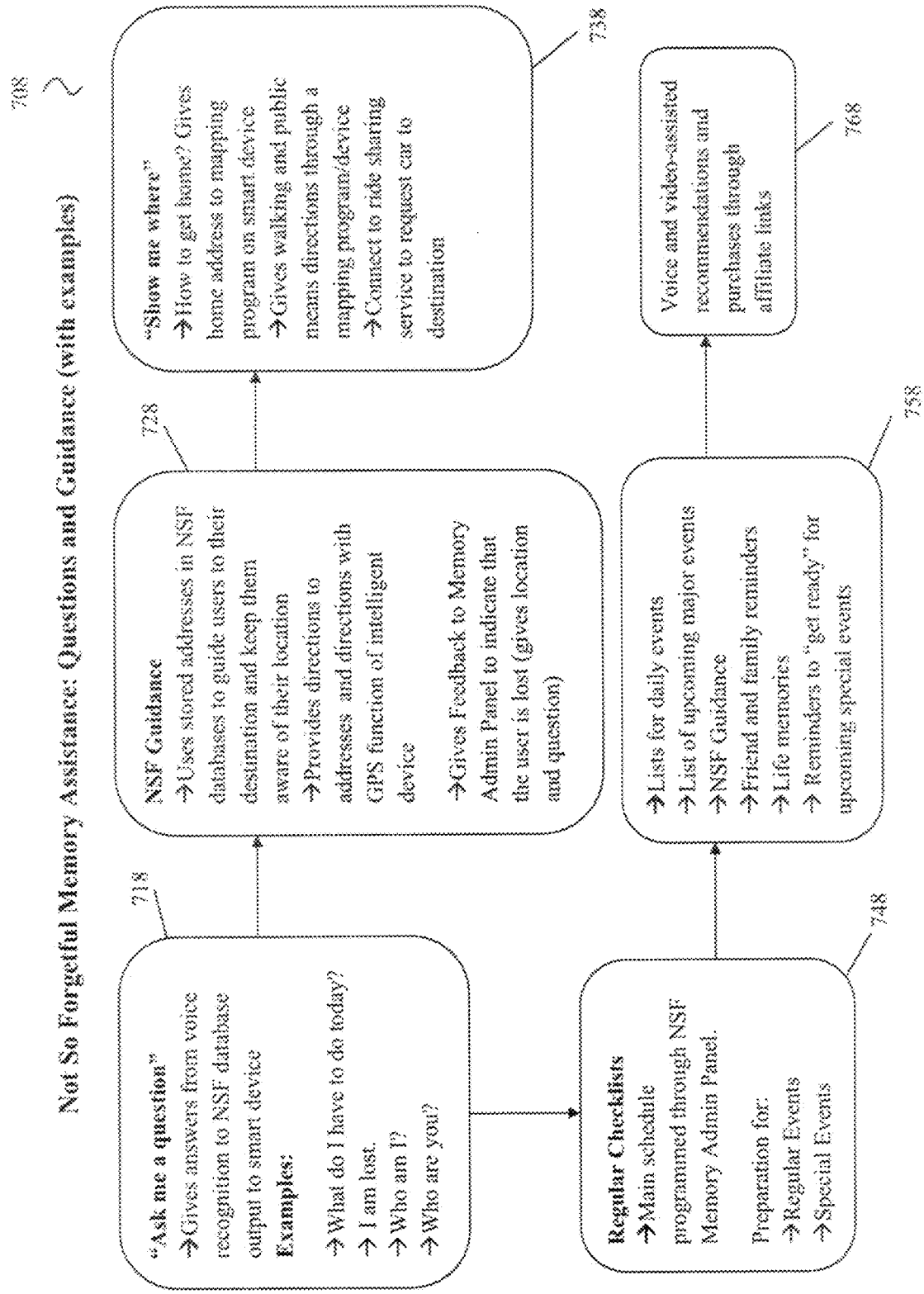

Referring to FIGS. 7A, 7B and 7C, the invention, as explained above, may provide personal and family reminders, display user-selected life memories (for example, in photographs or videos or audios), and assist the user with recognizing photographs of important people and the user's own photograph. Referring first to FIG. 7A, there is shown a functional diagram of a NSF memory assistance algorithm (with some examples). Function 710 comprises a means to control key lists (for example, to do lists, daily events and other NSF calendar events). All of the functions of function 717 are performed with the assistance of a Memory Administration Panel which may comprise what one does on a given day and may be stored at device 230 or NSF panel server 220. "Life memories" databases may comprise a calendar and events including a date and identity of audio recordings (Benny Goodman orchestra), pictures (of the trip to the Grand Canyon in 1959), videos (of weddings), biographical information (easily forgettable such as user names and passwords for accounts) and not so forgettable such as anniversary date, birthday and social security number, and favorite musicians (such as Lawrence Welk and his orchestra). Face and voice recognition may comprise a database through smart devices involving user input of special people who frequently visit a nursing home, for example, will be optionally coupled with audio, pictures and video recordings as well as text (such as a biography of a specific person) to assist the user to remember specific people, places and events as well as recommendations on what to do for specific occasions when a special person visits a nursing home on a birthday. NSF exchange involves exchange of data with permission of the NSF personal network member about an NSF personal social network member. NSF may provide a location service when lost involving, for example, GPS and stored locations of where an NSF member should be, GPS determining where they are and the location service advising with simple instructions how to return. FIG. 7A, function 710 may be programmed, personalized, controlled automatically from an administration panel at NSF server 220 or at device 270 or administered with the help of a permitted son, daughter, sibling, friend, caregiver, etc.

From function 710, a checklist may be developed comprising, for example, light occasional reminders, for example, what does the NSF member typically accomplish on a given day of the week. A to-do list may comprise washing, ironing, cleaning and also include reminders of NSF events such as one's daughter's birthday. One may refer to this list as a honey-do list, for example, don't forget to pick up the dry cleaning or buy two cartons of milk at the grocery store. One may edit an automated list, edit reminders, add text, check off items as performed, etc. Examples include and are not limned to: lists for shopping, obtaining office supplies, having yard work performed or performing the yard work one's self such as mowing the lawn and appointment reminders such as dentist, hair salon, doctor, vehicle maintenance and the like. Function 740 shows that at device 230 an NSF user may check off an item when completed (or request periodic reminders as an event data approaches or postponing the date for mowing the lawn because of the weather) and removing an item from the list (checking off as completed) when the item is completed. In this function, the item may be removed from the list and a feedback/message of finished items provided to the administration panel which will be able to generate an updated to do list. Function 740 may lead back to function 710. As described above, the arrows are exemplary and may be varied in direction on occasion or point to other functions.

Function 720 points to function 730 or NSF Purchasing Affiliate Recommendations when a gift and/or social engagement recommendation is made, for example, by display of a Gift and/or social engagement Registry or by a generated display of trending data for a given demographic of the recipient. The purchasing affiliate (or even a non-affiliate) may provide special discount coupons (such as food coupons) for at a grocery store affiliate. One such known coupon dispenser is Brandcaster for an affiliate brand of goods. Yard item coupons may be available from Home Depot, etc. Office supply coupons may be available from Office Depot or Staples.

Now a "heavy" list will be discussed where function 710 points to function 750 for developing a "heavy" checklist for regular memory forgetfulness reminders: did you buy food? Did you eat your meal? Did you take your meds? Did you order your needs? These are examples and many nursing homes perform these functions for the mentally deficient person but these same individuals become embarrassed or their pride is hurt when they have to rely on such manual reminders. Similarly as function 740, at function 770, if the NSF member has performed the reminder, the NSF user may provide acknowledgement or feedback of checked off items and a message sent to the administration panel server 220. If the answer is no at function 760, the item was not performed, text, voice and or video may be played to assist the NSF user to perform the item or make the purchase with programmed our on-line assistance, for example, from purchasing affiliate recommendations and instruction. For example, function 760 may point to function 780 where an affiliate may provide, for example, Safeway.com (grocery delivery), drugstore.com (pharmaceutical delivery) and Amerimedx.com (Prescription refills and the like).

Function 780 may actuate function 770 as described above once, for example, Safeway delivers the desired groceries or drugstore.com delivers the meds (without having the embarrassment of having to be reminded by nursing home or retirement community reminders. The same is true for, for example, in the example of a visit from a son or daughter event where the NSF member may be embarrassed not remembering which child is coming or what they look like. Their own JPEG picture file may be organized to show a picture of the visiting son or daughter and be tied to associated NSF data of their birthday, anniversary, graduation or other important event. Function 770 may trigger function 710 when appropriate.

Referring to FIG. 7B, there is shown Not So Forgetful Heavy Memory Assistance of FIG. 7A with examples. Function 715 provides social reminders such as family occasions (birthdays, graduations, funerals), parties and other invited events such as card and dinner parties or dances) and other forms of social events (which may be retirement community events of interest to the NSF member. Function 715 may lead to function 725 at the occasion itself, for example, face recognition (assisted by retrievable photographs) or via Google Glasses and known voice recognition software (which may be matched with a stored voice of an NSF social network family member or friend), image recognition, and sensory recognition from the NSF database through a smart device such as a smart phone, smart watch, smart glasses, etc. Function 725, in turn, may lead to function 735 such as family reminder which may be provided as an optional or periodical function when needed or when the NSF member's memory needs a boost. Function 735 may perform person recognition and matching of photograph or audio information from a local NSF app device 230 and there may be an option to show the NSF member specific information such as photographs of one's last trip to Europe with one's spouse. At function 745, if the option for special information is requested, the device 230 may retrieve specific biographical information for one's self, relative or significant other as well as pictures, videos, audios or text such as biographical data through various devices 230 (for example, an iPhone, an Apple watch, a tablet, smart glasses, a computer and so on).

Still referring to FIG. 7B, there is shown a function 785 for event reminders and recommendations, for example, anniversaries, birthdays, graduation ceremonies and the like. Function 785 may be called to retrieve audio, text, photograph and video assistance (for example, to assist one to recall what may occur at a birthday and what one is expected to do in preparation). Recommendations for gift and/or social engagements may be generated and purchases suggested through purchasing affiliate links and other purchasing sources. Likewise, social reminders function 715 may point to function 795 to provide assistance with the specific identified family occasion, party or social event.

Life memories may require heavy reminders at any time as shown at function 755: stored events in the form of media for, for example, one wedding with text description may be retrieved and cataloged according to events and people and time in the administration panel algorithm with personal information added by the NSF user. Life memories function 755 may point to Questions and Examples 765 where Questions may include the user inputting questions about a life memory and the memory at each of the personal device 230 or the NSF server 220 may provide the answer: for example, who is this person, who am I, what year is it? How old is he or she? Can you show me my wedding video (or that of another family member or friend)? Remind me of what music and musicians I like (Benny Goodman and his orchestra?) Life memories may be retrieved by an administrative panel automatically via NSF server 220 from social network or even public services. Life memories may be especially significant for users whose short term memory may be impaired but their long term memory is still very active. Such a user may be able to recall a long term memory retrieved from a memory of their client device or NSF server and use, for example, a photograph of an individual to retrieve the identity of a visitor that their short term memory may not be able to recall. Software may be provided for personal recognition and matching of information about an event from a public or private database. Was your wedding described in the New York Times? There may be an option for a memory service to provide information such as the location of a gravestone at a cemetery from the cemetery web site or database via search engine 210.

Referring to FIG. 7C, the invention may allow the user to ask a question and input data through voice recognition and then obtain guidance (with examples of such question and guidance). Function 718 may simply say: Ask me a question? And the user device 230 may be able to provide an answer from voice or image or event recognition at an NSF server 220 and provide the answer at personal device 230. Examples may include: What do I have to do today? Am I lost? Who am I? Who is this person standing in front of me at my bedside? Function 718 points to NSF guidance 728 and to regular checklists 748. NSF Guidance 728 uses stored addresses in NSF databases 200 to guide NSF members to their destination and keep them aware of their location, for example, via GPS. It may provide directions to addresses and directions with GPS functions of intelligent device 230 or resort to NSF server 220 for further details. Once used, function 728 may give feedback to a memory administration panel to indicate finding a user who is lost and provide a question and a location and example directions to a destination if an NSF member wonders as may occur with Alzheimer's disease. Function 738 is related to function 728 by "show me where" examples. For example, I am lost, how can I get home safely? The output may be a home or nursing home address and mapping program on a smart NSF device 230. The device 230 may alternatively provide walking directions or suggest public means of transportation via bus, cab, subway, train or other transportation services and costs. A ride-sharing service (for example, Uber or a taxi) may be called upon to request a car to a home destination. The "I am lost" alert feature of function 738 allows the sharing of a user's location with an administrator, deputy, designated family member or other authorized individual and alerts the authorized individual that the user is lost.

Regular checklists function 748 may include a main schedule for a given day of the week automatically programmed by what the NSF user has done in the past on that day via NSF administration panel server 220. The check list may help the NSF user with preparation for regular events such as regular visits from a son or daughter and special events such as parties at the retirement community. Checklist function 748 may point to function 758 for compiling lists for daily events, upcoming major events, NSF guidance (for what to do and what to buy for such an event), friend and family reminders from the personal social network, life memories (for example, stored photographs and/or audios) and reminders for how and when to get ready for upcoming special events. The user may ask for a reminder of tasks and events with a question such as "what do I have to do today?" and receive a reminder from the NSF events calendar and/or the light and heavy reminder checklists. A person with severe memory impairment may ask, for example, "who am I?" or "who are you?" and the camera of a smart device such as smart glasses may use image recognition coupled with stored photographs in the database to provide an answer to the user.

Face and voice recognition through smart devices 230, for example, will be optionally coupled with audio, pictures and video recordings at function 768 as well as text (such as a biography of a specific person) to assist the user to remember specific people, places and events as well as recommendations on what to do for specific occasions. For instance, the administrator attaches a name and a short biography to a face recognition with a picture (for instance Roger Burnsby, your son, age 24). When the user is in front of his son, Roger, the smart device such as Google glasses 230 may show this text biography and read this from optional audio such as through as through a Bluetooth headset. Voice recognition works in the similar way to recognize a voice signature and indicates who is speaking (the son) and indicates this through a smart NSF device 230. Function 768 may optionally suggest a gift and/or social engagement recommendation through a gift and/or social engagement registry or trending algorithms through purchasing affiliate links. Function 768 may allow for automated and/or manual purchasing.

Voice recognition from smart devices can also use phrases such as "where am I" to assist the user with GPS, mapping programs (such as google or apple maps) to give a status update of where a person is and where they have to go next. If a person is lost and asks to go to a location such as or "how do I get home" or "take me to my son's house", the Not So Forgetful demographics databases 200 are accessed and coupled with mapping programs to direct the NSF user to that destination either through, for instance, walking, public transportation or a ride-sharing service. If the user asks for further assistance, such as a taxi or is at a location where the distance (programmed from the memory administrator panel) is too great, then a ride sharing affiliate such as Uber is contacted with the GPS location and the destination. The administrator panel 220 also can automatically choose to get push/email notifications of where the NSF user is during their journey and assist the NSF user if they are deviating off track, or when the user has asked for assistance and the administrator receives information such as what the key question was and its reference or lack of reference to the NSF user's GPS location.

Voice Recognition can also be used to assist with memories stored on the NSF server 220 databases 200 that can be accessed in the form of pictures, audio and video recording and called up from the Memory Database at database 200 or locally stored on device 230. For instance, a voice command to play my "wedding video" can be brought up on a smart device 230 (such as via Google glasses or other smart glasses) or "show me a picture of my wife" can be brought up on a smart device 230 (such as an iPhone or other smartphone).

In performing the light and heavy memory reminder functions outlines in FIG. 7A, FIG. 7B, and FIG. 7C, the application may use smart device input such as heartbeat, travel, motion, sensory/object recognition via voice, image, etc., data files, sounds, images, GPS data, cell triangulation data, etc. to determine or verify whether the user has performed tasks that the reminder function has reminded the user to do. The application may optionally provide information back to the user and/or the designated deputy administrator for updates on the progress of memory assistance, recommendations, locations and status of the user.

Figure 8:
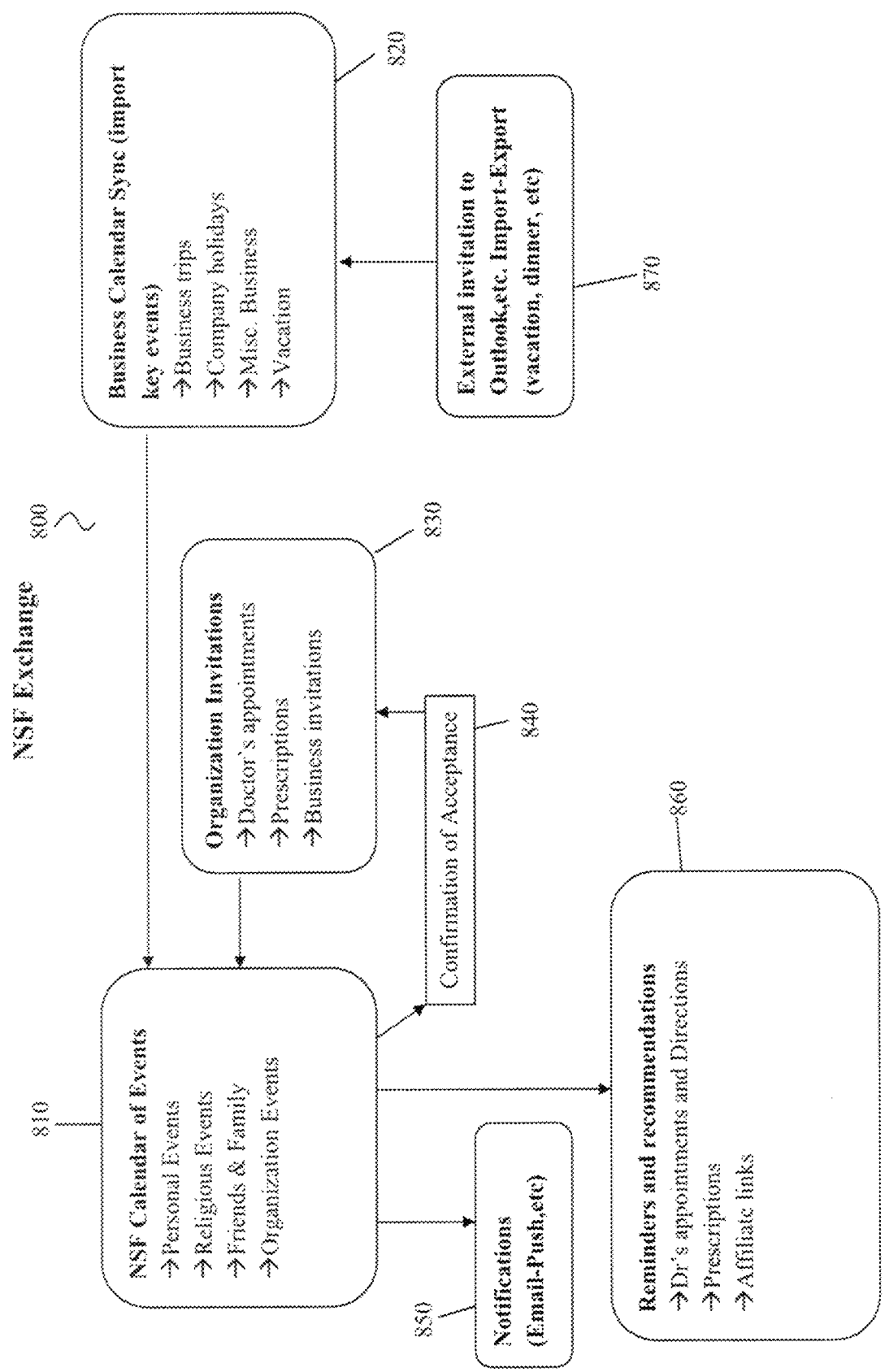
FIG. 8 is a flowchart showing the exchange of information between the memory assistance feature of the present invention and other calendars and event invitation systems.

Referring to FIG. 8, there is shown an NSF Exchange with examples. FIG. 8 may show a way provided to import external events (such as medical appointments at function 860) as well as give feedback to accept the appointment (function 840). For example, the NSF system may be linked to external calendars (function 810) to provide users with reminders of medical appointments (for instance, function 860 from an Outlook invitation). The invitation can be accepted 840 and at a set point before the event, a reminder is sent (see loop 840, 830, 810 for a periodic reminder of a doctor's appointment or of a prescription refill or a business invitation. If a prescription is made from a doctor through electronic means, it is entered into the calendar at 810 and a reminder email or push is sent (via function 850) with a purchasing affiliate link(s) to purchase the medicine. If there are repeated doses, this is logged into the calendar and reminders are sent with recommendations where to purchase the medicine through affiliate accounts.

Another function is a business calendar synchronization function 820 which may lead from function 810 whereby key events, which may be outside the NSF social network, may be imported. These may include business trips (which may conflict with NSF social network events), company holidays (which may represent free time besides weekends) miscellaneous business which may represent business meetings outside of working hours that are necessary and may be outside an NSF social network and scheduled vacation time (which may be reflected in an NSF social network event planning). As a result of function 820, there may be a bi-directional function 870 for external invitations through Outlook, iCal and the like to import/export such events as a scheduled vacation, a business or social dinner and business trip and the like.

These and other features of the invention will be understood to be set forth in the following claims to the invention which should not be construed to be limited in scope to the features set forth above but may include those features which could be easily understood by one of ordinary skill in the art from reading the present application and examining the enclosed figures, flowcharts, hardware diagrams and additional materials including a story board (Exhibit A), a technical research and design report (Exhibit B), an API diagram (Exhibit C), an application flow diagram (Exhibit D), and a wire frame (Exhibit E). All exhibits are incorporated by reference into this specification. Exhibit A provides several examples of screen displays showing various contemplated features of the present invention. Exhibit B provides a further explanation and examples of the gift and/or social engagement recommendation algorithm and sources of external trending data. Exhibit C and Exhibit D are flow charts showing possible systems of information flow in the present invention. Exhibit E is a wireframe showing a further example of an application flow for the present invention with several screen displays and options for selecting interests and creating events. Exhibit D and Exhibit E are each submitted with a first page showing an overview of the entire flowchart and subsequent pages showing enlarged sections of the flowchart to provide a larger, more readable text format. These exhibits should be understood as examples of various embodiments of the present invention which do not limit the scope to any specific application flow or algorithm. The features and functionality of the invention may be accomplished by the algorithms set forth in the Exhibits or by alternative means.

What I claim is:

1. A non-transitory computer readable medium with instructions stored thereon for each of a smart mobile client device, for an associated cloud-based administration panel server and for a plurality of search engines available at uniform resource locators, the non-transitory computer readable medium comprising a main memory of each of the smart mobile client device and the associated cloud-based administration panel server, the main memory of each of the smart mobile client device, the plurality of search engines and the associated cloud-based administration panel server for storing respective trending and memory assistance algorithms, a personal social network comprising a first and a second smart mobile client device personal to a first and a second user respectively and the associated cloud-based administration panel server, the personal social network enabling a sharing of gift, event and social engagement likes, dislikes, hobbies, invitations, profiles and events information within the personal social network upon receipt of permission data to receive the shared information at the first smart mobile client device of the first user, the permission data to receive the shared information entered by the second user being one of a selected family member and friend of the first user responsive to receipt by the first smart mobile client device of the first user of permission to receive the shared information from the second smart mobile client device of the second user selected family member or friend, the personal social network further providing individual and group messaging within the personal social network, the personal social network comprising:

the first and the second smart mobile client device containing a first non-transitory computer readable medium with instructions stored thereon in a main memory of the smart mobile client device for smart mobile client device trending and memory assistance algorithms of the first and second user and one of a global positioning system, cell tower triangulation and manual entry by the first and second user for obtaining location and travel data of the first and the second smart mobile client device, the location and travel data uploadable to the associated cloud-based administration panel server, one of the first and second smart mobile client device further having at least a special purpose processor, data output apparatus comprising a display and a speaker, the global positioning system for obtaining location data of the first and second smart mobile client device, data input apparatus comprising a keyboard and a microphone, a secondary memory for receiving data input of shared demographics data comprising religion, sex, age, occupation, physical and mental health, biometrics, gift, event and social engagement, likes, dislikes, hobbies, invitations, profiles and events information by the second user with the first user of the first smart mobile telecommunications device and a communications interface to the associated cloud-based administration panel server containing a second non-transitory computer readable medium with instructions stored thereon or main memory, the associated cloud-based administration panel server having a special purpose processor capable of learning via a trending algorithm from external application peripheral interfaces and internal data by continuously updating a gift and social engagement registry for a given demographic as a gift for purchase by a member of a given demographic and recording purchase data for storage in demographics and trending databases, the second non-transitory medium with instructions stored thereon in a main memory of the cloud-based administration panel server for cloud-based administration panel trending and memory assistance algorithms, a secondary memory for storing transitory data, one of a global positioning system, cell tower triangulation and manual entry for uploading the location and travel data of a smart mobile client device having a global positioning system to the associated cloud-based administration panel server and to a communications interface to a plurality of search engines, the demographics database and the trending database and to the smart mobile client devices, each search engine for searching for data for storage in the secondary memory of one of the smart mobile client device responsive to a command of the cloud-based administration panel server related to one of memory assistance, gifts, events and social engagements under main memory control of the cloud-based administration panel server, the plurality of search engines, responsive to the associated cloud-based administration panel server and communications interface with, at least one search engine of a purchasing affiliate generating one of a structured language query and other database queries for learning and periodically developing gift and event trend data comprising new and discontinued products, services, upcoming events and social engagements, demographics data and location and travel data as well as via application peripheral interfaces of vendors external to the personal social network, and a plurality of personal social network databases, responsive to the plurality of search engines and the associated cloud-based administration panel server including a demographics database and a trending database, the cloud-based administration panel server, having the trending and memory assistance algorithms, continuously updating the trending and demographics databases using top ten trending from location data and travel data and for a given demographic as a gift is purchased by a member of a given demographic uploaded by the first and second smart client devices, demographic, biometric and physical and mental health data collected by the first and second smart mobile client devices and reported to the associated cloud-based administration panel server, the communications interface of the smart mobile client devices of users of the personal social network further having access to at least one demographics database of the cloud-based administration panel server for receiving demographics data specific to the user of the personal social network including sex, age, religion, occupation, physical and mental health, biometric and life memory data input and one trending database for receiving likes, dislikes, hobbies, invitations, profiles and events, the secondary memory of the smart mobile client devices of the users of the personal social network for receiving updated memory assistance, demographics, smart mobile client device location data obtained via the global positioning system of the smart mobile client device and trending data input;

each of the trending and demographics database of the cloud-based administration panel server trending and memory assistance algorithm for receiving continuously updated trending gift data for a given demographic and memory assistance data personal to a user of the personal social network, the cloud-based administration panel server having access to at least one of the plurality of search engines, the trending and memory assistance algorithms for generating the at least one database comprising the demographics database, demographic data of the demographics database comprising age, sex, religion, occupation, location, biometric, hobbies, likes, dislikes, physical and mental health and assistance data obtained by the plurality of search engines and demographics data uploaded from the secondary memory of the smart mobile client device of users of the personal social network and the trending database of the smart mobile client device, and the cloud-based administration panel server periodically learning and periodically developing current gift and social engagement trends and communicating with the plurality of search engines for receiving from one of the plurality of search engines trending data comprising new and discontinued products and services available in a geographic area, demographics data comprising updated age, sex, gender, religion, location, and trending data comprising at least new and discontinued products and services available to users, biometric, physical and mental health and memory assistance data of users of the personal social network, the trending, demographics and memory assistance data automatically uploaded from the one of the plurality of search engines to the cloud-based administration panel server, the cloud-based administration panel server for downloading to the secondary memory of the first smart mobile client device trending and demographics data, the demographics data including age, sex, religion, occupation, biometric, physical and mental health and memory assistance data concerning the first user of the first smart mobile client device and periodically supplementing and continuously updating trending, demographics data and memory assistance data to the second smart mobile client device concerning the second user; and the smart mobile client device memory assistance algorithm and a related reminder application of a smart mobile client device being coupled to one of a sensor of fire and carbon monoxide for use by a user of the personal social network with a memory impairment, the sensor for detecting one of a fire and the existence of carbon monoxide in the air and automatically calling one of a smart mobile client device of a designated emergency contact and calling an emergency assistance provider.

2. The non-transitory computer readable medium with instructions stored thereon for a smart mobile client device, for an associated cloud-based administration panel server and for a plurality of search engines available at uniform resource locators, each comprising respective trending and memory assistance algorithms, the personal social network for family and friends of a user of a computer-implemented reminder application of claim 1 further comprising:

an interests, likes, dislikes, hobbies and events database being maintained by the special purpose computer processor of the cloud-based administration panel server and the smart mobile client device personal to a user of the personal social network, the trending algorithms of the cloud-based administration server and the smart mobile client device for continuously generating the trending and the demographics database of each of the cloud-based administration server and the smart mobile client device comprising:

creating a predefined list of interests, likes, dislikes, hobbies and events in the secondary memory of the smart mobile client device of the user of the personal social network for a given demographic and editable to be personalized to the user of the smart mobile client device, the predefined list input by the user of the smart mobile client device comprising a selection of sports and music likes, the sports and music likes being personalized to one of a selection of one of rock music, classical music and jazz music and a specific music producing group and a sport from one of professional baseball, hockey, football and basketball, the first smart mobile client device prioritizing interests, likes, dislikes, events and hobbies and particularizing interests, likes, dislikes, events and hobbies to identify a particular favorite interest, like, dislike, event and hobby, the prioritizing influencing a type of gift, social engagement or event recommendation to be received by an individual user or participant in the personal social network and a receiver user of the second smart mobile client device of a similar prioritized gift, social engagement and event recommendation under command of the trending algorithm of the smart mobile client device, the gift, social engagement and event recommendation for storage in secondary memory of the second smart mobile client device via a push notification initiated by one of the cloud-based administration panel server and the plurality of search engines to the first mobile client device, and responsive to selected favorite interests, likes, dislikes, hobbies and events being in the geographical area of the first and second smart mobile client devices responsive to the global positioning system of the first and second smart mobile client devices of the receiver of information of selected interests, likes, dislikes, hobbies and events and a shared proximate location of the second smart mobile client device to the first smart mobile client device, the second smart mobile client device responsive to the global positioning system of the first smart client device of the first individual user and participant automatically notifying the second smart client device of the receiver via the push notification of an opportunity to attend a prioritized sport or music event from the selected favorite types with those interests, likes, dislikes, events and hobbies of the user of the first smart mobile client device of the personal social network.

3. The non-transitory computer readable medium with instructions stored thereon for a smart mobile client device, for an associated cloud-based administration panel server and for a plurality of search engines available at uniform resource locators, each comprising respective trending and memory assistance algorithms, each comprising respective trending and memory assistance algorithms, the personal social network application of claim 1 further comprising:

creating a profile, responsive to the cloud-based administration panel and the plurality of search engines, for a child under a predetermined age in secondary memory of the smart mobile client device personal to an adult parent of the child and member of the personal social network where access to likes, dislikes, interests, events and hobbies of the child, the child's profile being controlled by an adult parent user, such that, once the child reaches the predetermined age of permission; if the child becomes a member of the personal social network and possesses a smart mobile client device personal to the child running a computer-implemented trending algorithm application for continuously generating the trending database and the demographics database, the smart mobile client device of the child including a global positioning system and a continuously updating trending algorithm, the child being invited to authorize creation of a demographic profile for the child in their name, and the child demographic profile being automatically and continuously updated responsive to the cloud-based administration panel server and the plurality of search engines responsive to the child's creation of a demographic profile.

4. The non-transitory computer readable medium with instructions stored thereon for a smart mobile client device, for an associated cloud-based administration panel server and for a plurality of search engines available at uniform resource locators, each comprising respective trending and memory assistance algorithms, the personal social network application of claim 3 further comprising:

outputting, to the display of the smart mobile client device of the adult parent user, the child demographic profile being visible to the adult parent user, a command to the display of the smart mobile client device of the adult parent user having a global positioning system for locating the smart mobile client device of the adult parent user to opt to not make the child profile visible to the child being entered by the adult user into their smart mobile client device except for gift, event and social engagement reminders and recommendations generated by the personal social network application of the smart mobile client device based on the child's demographic information, likes, dislikes, interests, hobbies and specific event and gift data, and such child's demographic information, likes, dislikes, interests, hobbies and specific event and gift data being sent for display on a smart mobile client device of the child having a global positioning system for locating the smart mobile client device of the child of the adult user by one of text, audio and video to the smart mobile client device of the child of the adult parent user running the computer-implemented personal social network trending and memory assistance algorithms when the child of the adult parent user reaches the predetermined age.

5. The non-transitory computer readable medium with instructions stored thereon for a smart mobile client device, for an associated cloud-based administration panel server and for a plurality of search engines available at uniform resource locators, each comprising respective trending and memory assistance algorithms, the personal social network application of claim 1 further comprising:

a system of sharing a cost of purchasing a gift or attendance at an event among a group of friends and family with each member of the group also being a member of the personal social network having a smart mobile client device controlled by the cloud-based administration panel server within the personal social network through a special gift, event or social engagement registry invitation transmitted by at least one member of the group using their smart mobile client device having the global positioning system for obtaining location and travel data of its user through the personal social network, the cost sharing system comprising a messaging function in the personal social network with a choice to purchase gifts or admission to events and social engagements together by placing a debit/credit card payment or payment service through a commitment to the group purchase, the cost sharing system providing an option for a user and member of the personal social network to initiate a group purchase invitation to respective communication interfaces of smart mobile client devices of the group of friends and family with similar gift, event and social engagement interests with a suggestion for a gift, event or social engagement purchase, a suggested cost sharing amount per participant being calculated by the smart mobile client devices of the group of friends and family with similar interests, and a notification of the number of people who have signed up for the gift, event or social engagement, an option to accept the recommended amount or charges comprising a price per member of the group which varies depending on a number of members of the group and a deadline for submitting the recommended amount or charges per member of the group to complete the group purchase of a gift, event or social engagement.

6. The non-transitory computer readable medium with instructions stored thereon for a smart mobile client device, for an associated cloud-based administration panel server and for a plurality of search engines available at uniform resource locators, each comprising respective trending and memory assistance algorithms, the personal social network for family and friends of a user of a computer-implemented reminder application of claim 1 comprising:

the smart mobile client device memory assistance algorithm and a related reminder application of the smart mobile client device having the global positioning system to locate the smart mobile client device having sensors and location of the device for use by a member of the personal social network for monitoring medical data sensed by sensors coupled to the smart mobile client device comprising at least one sensor of one of blood pressure, temperature and pulse of the member of the personal social network to determine a priority of one of transmitting one of an emergency alert to medical personnel and making a medical appointment responsive to the monitoring of medical data.

7. The non-transitory computer readable medium with instructions stored thereon for a smart mobile client device, for an associated cloud-based administration panel server and for a plurality of search engines available at uniform resource locators, each comprising respective trending and memory assistance algorithms, the personal social network for family and friends of a user of a computer-implemented reminder application of claim 1, the smart mobile client device memory assistance algorithm and a related reminder application of a smart mobile client device comprising one of an accelerometer and a gyroscope detecting a fall by a member of the personal social network and transmitting an emergency alert to medical personnel, the smart mobile client device further comprising a global positioning system for locating the smart mobile client device of an individual with need for assistance.

8. The non-transitory computer readable medium with instructions stored thereon for a smart mobile client device, for an associated cloud-based administration panel server and for a plurality of search engines available at uniform resource locators, each comprising respective trending and memory assistance algorithms, the personal social network for family and friends of a user of a computer-implemented reminder application of claim 7, the smart mobile client device memory assistance algorithm and a related reminder application of a smart mobile client device of an individual with memory issues comprising:

updating progress on a need for memory assistance, recommendations of vital tasks and status of the individual with memory issues to the smart mobile client device of the individual with memory issues and the smart mobile client device of the designated emergency contact responsive to the cloud-based administration panel server communicating with the plurality of search engines, the smart mobile client device comprising a global positioning system for locating the smart mobile client device of the individual with memory issues to provide location data as to the location of the smart mobile communication device.

9. The non-transitory computer readable medium with instructions stored thereon for a smart mobile client device, for an associated cloud-based administration panel server and for a plurality of search engines available at uniform resource locators, each comprising respective trending and memory assistance algorithms, the personal social network for family and friends of a user of a computer-implemented reminder application of claim 1, the smart mobile client device memory assistance algorithm and a related reminder application of a smart mobile client device comprising:
obtaining a highest priority task for performance first of one of a repeated daily task of a checklist of repeated daily tasks and a thing to do of a checklist of things to do and, for a member of the personal social network with memory issues having a smart mobile client device personal to the member with memory issues, providing a heavy reminder of a vital daily task comprising one of taking medications and eating meals.

10. The non-transitory computer readable medium with instructions stored thereon for a smart mobile client device, for an associated cloud-based administration panel server and for a plurality of search engines available at uniform resource locators, each comprising respective trending and memory assistance algorithms, the personal social network for family and friends of a user of a computer-implemented reminder application of claim 9, the smart mobile client device memory assistance algorithm and a related reminder application of a smart mobile client device comprising:
the member of the personal social network in need with memory issues having the smart mobile client device, the smart mobile client device equipped with a global positioning system, the speaker, the microphone, a camera and the display, for respectively locating the smart mobile client device and for playing one of a voice and a video to assist the member in need with memory issues to perform one of a repeated daily task and a thing to do, to play recorded life memories and to identify persons on request via one of the camera and the microphone input and voice and image recognition by the memory assistance algorithm by the smart mobile client device of the member in need with memory issues.

\* \* \* \* \*